United States Patent
Duncan et al.

(10) Patent No.: US 11,120,928 B2
(45) Date of Patent: Sep. 14, 2021

(54) APPARATUS FOR INSTALLING A SLEEVE ON A CABLE

(71) Applicant: The Boeing Company, Chicago, IL (US)

(72) Inventors: Grace L. Duncan, Seattle, WA (US); Lars E. Blacken, Bothell, WA (US); Keith M. Cutler, Kirkland, WA (US); Bradley J. Mitchell, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 233 days.

(21) Appl. No.: 16/195,520

(22) Filed: Nov. 19, 2018

(65) Prior Publication Data

US 2020/0161028 A1 May 21, 2020

(51) Int. Cl.
*B23P 19/00* (2006.01)
*H01B 13/06* (2006.01)
(Continued)

(52) U.S. Cl.
CPC .......... *H01B 13/062* (2013.01); *B25J 11/005* (2013.01); *B25J 15/00* (2013.01); *H01B 13/0036* (2013.01)

(58) Field of Classification Search
CPC ........ H02G 1/00; H02G 1/14; H02G 15/1806; H02G 15/182; H01B 13/0036;
(Continued)

(56) References Cited

U.S. PATENT DOCUMENTS

| 4,685,636 A | 8/1987 | Eaton |
| 5,125,154 A | 6/1992 | Cross |

(Continued)

FOREIGN PATENT DOCUMENTS

| EP | 0382407 A1 | 8/1990 |
| EP | 3376612 A1 | 9/2018 |

(Continued)

OTHER PUBLICATIONS

Extended European Search Report dated Apr. 15, 2020 in European Patent Application No. 19209585.9 (European counterpart to the instant U.S. patent application).

(Continued)

*Primary Examiner* — Paul D Kim
(74) *Attorney, Agent, or Firm* — Ostrager Chong Flaherty & Broitman P.C.

(57) ABSTRACT

A method utilizes a funnel system and robotic end effector grippers to feed an unjacketed portion of a shielded cable through a sleeve. The funnel is designed with one or more thin extensions (hereinafter "prongs") on which a sleeve is placed prior to a cable entering the funnel. Preferably two or more prongs are employed, although a single prong may be used if properly configured to both guide a cable and fit between the sleeve and cable. The prongs close off the uneven surface internal to a sleeve and provide a smooth surface for the cable to slide along and through the sleeve, preventing any damage to the exposed shielding. The sleeve is picked up and held on the prongs using a robotic end effector. If the sleeve is a solder sleeve, the robotic end effector has grippers designed to make contact with the portions of the solder sleeve that are between the insulating rings and the central solder ring.

21 Claims, 25 Drawing Sheets

(51) Int. Cl.
    *B25J 11/00*     (2006.01)
    *B25J 15/00*     (2006.01)
    *H01B 13/00*     (2006.01)

(58) Field of Classification Search
    CPC .............. H01B 13/062; H01R 43/0263; H01R 9/0512; B25J 15/00; B25J 11/005
    See application file for complete search history.

(56) References Cited

U.S. PATENT DOCUMENTS

| | | | |
|---|---|---|---|
| 5,152,395 A | 10/1992 | Cross | |
| 5,749,756 A * | 5/1998 | Vockroth | H01R 4/203 174/84 C |
| 6,857,550 B2 | 2/2005 | Wright et al. | |
| 7,513,357 B2 | 4/2009 | Abbestam et al. | |
| 8,430,229 B2 | 4/2013 | Abbestam | |
| 8,739,964 B2 | 6/2014 | Ek | |
| 8,794,432 B2 | 8/2014 | Ek | |
| 9,612,210 B2 | 4/2017 | Ray et al. | |
| 9,966,742 B2 | 5/2018 | Evans et al. | |
| 2009/0277685 A1* | 11/2009 | Aue | H02G 15/105 174/84 R |
| 2009/0280668 A1* | 11/2009 | Rodrigues | H01R 9/0524 439/271 |
| 2011/0266274 A1 | 11/2011 | Ebata et al. | |
| 2017/0258572 A1* | 9/2017 | Gordon | A61B 17/1782 |
| 2018/0267498 A1* | 9/2018 | Helmick | G05B 19/19 |
| 2020/0160504 A1* | 5/2020 | Duncan | H01B 13/0036 |
| 2020/0161780 A1* | 5/2020 | Duncan | H02G 1/14 |
| 2020/0161810 A1* | 5/2020 | Duncan | H01R 43/28 |
| 2020/0161824 A1* | 5/2020 | Duncan | H02G 1/1297 |
| 2020/0161843 A1* | 5/2020 | Duncan | H02G 1/1297 |

FOREIGN PATENT DOCUMENTS

| | | |
|---|---|---|
| JP | 2001286025 A | 10/2001 |
| WO | 2018172470 A1 | 9/2018 |

OTHER PUBLICATIONS

Patent Abstract for JP2001286025A submitted herewith.

\* cited by examiner

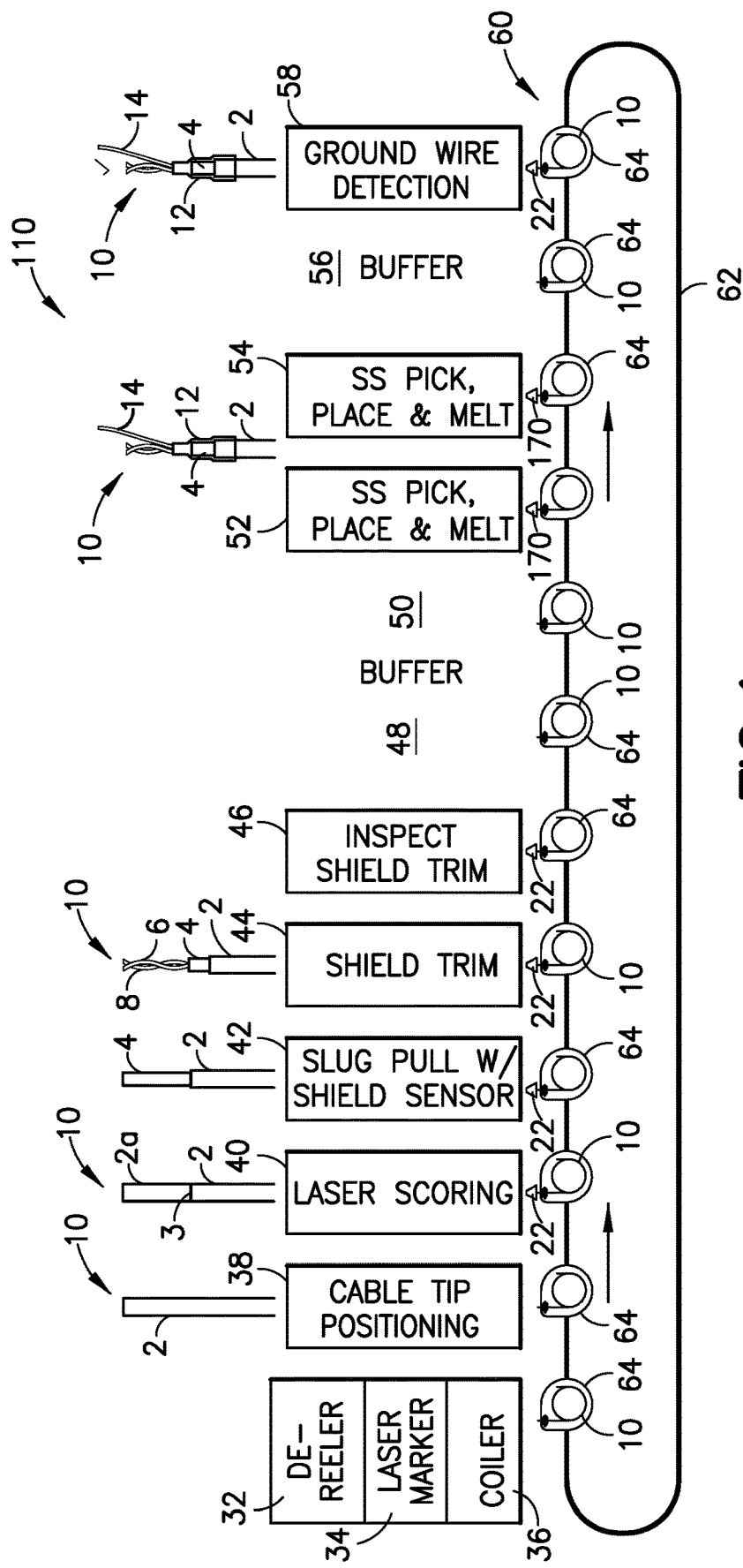

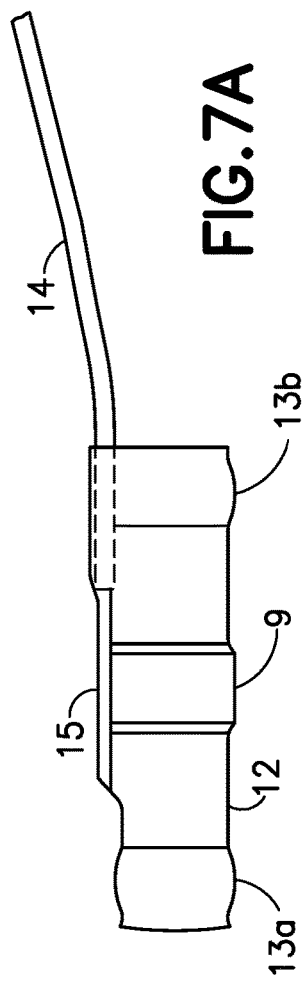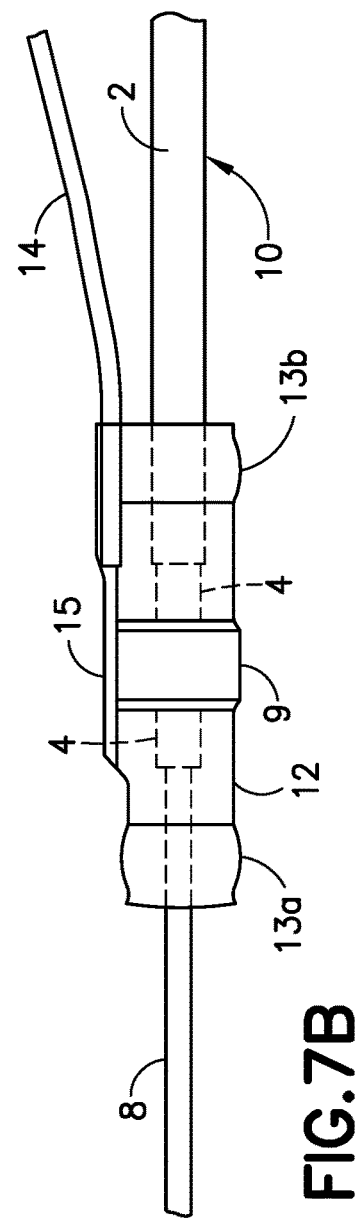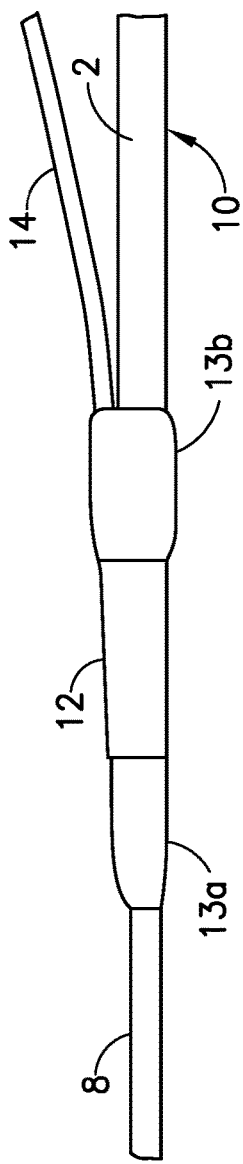

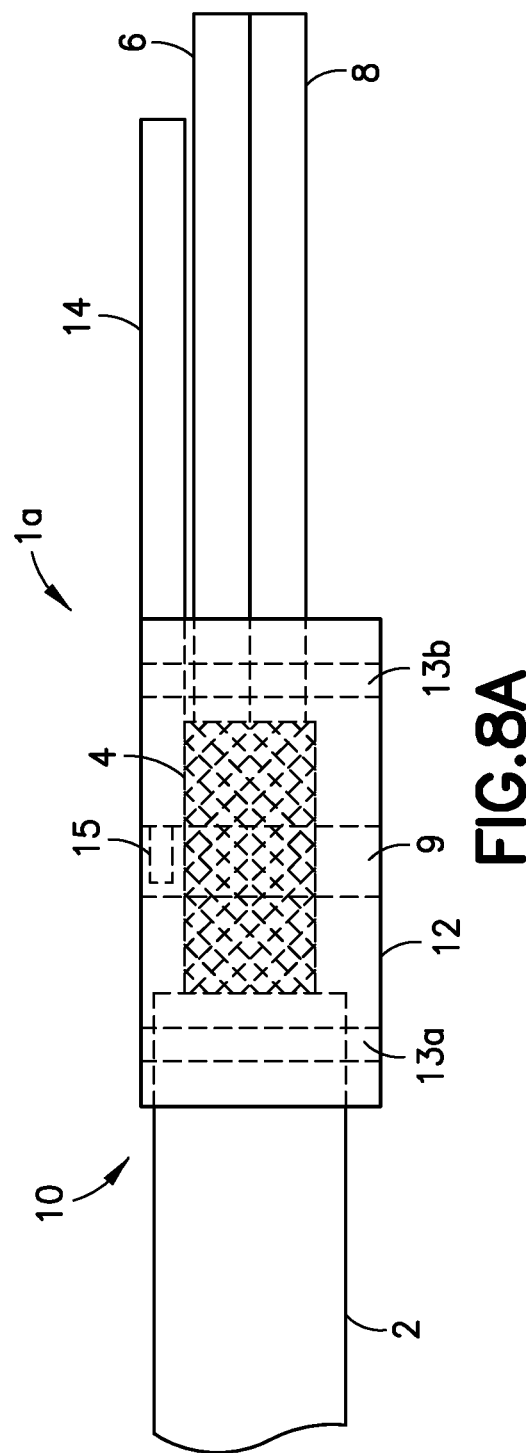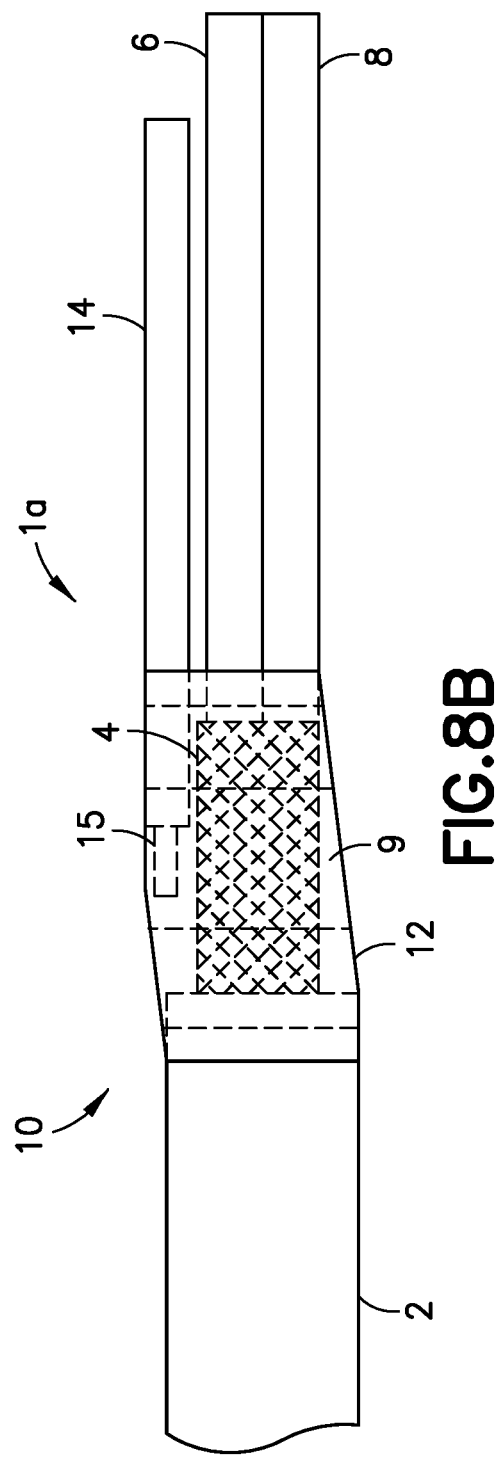

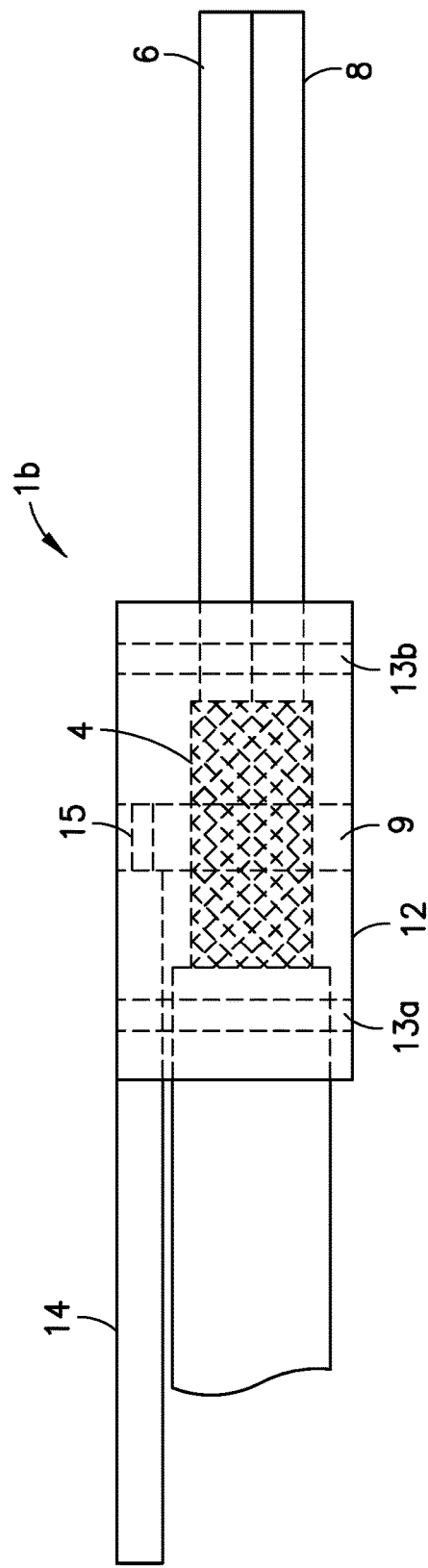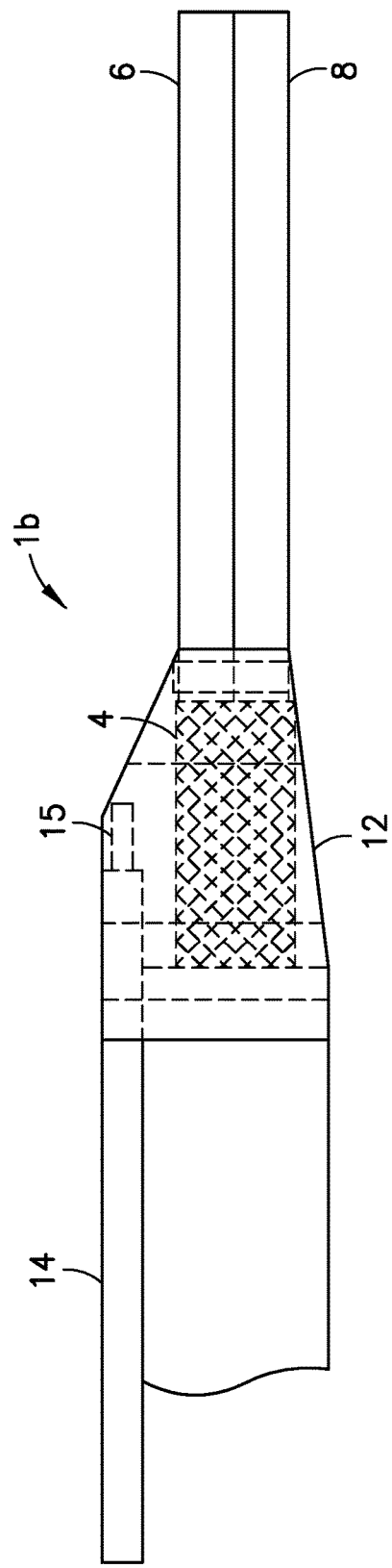

APPARATUS FOR INSTALLING A SLEEVE ON A CABLE

BACKGROUND

This disclosure generally relates to methods and apparatus for processing shielded cable. In particular, this disclosure relates to methods and apparatus for installing a sleeve on a cable.

Shielded cables incorporate shielding in an attempt to prevent electromagnetic interference. For example, the conductors may be surrounded by braided shielding made of metal. Because the shielding is made of metal, it may also serve as a path to ground. Usually a shielded cable incorporates a grounding wire that contacts the shield in an unjacketed portion of the shielded cable. Typically the grounding wire is attached to the unjacketed portion using a solder sleeve. Typically the solder sleeve is placed around a portion of a shielded cable having exposed shield and then melted in place.

One current process for installing a solder sleeve on a shielded cable is manual and labor-intensive. The process also requires additional steps, as a protective slug must be created and left in place as a solder sleeve is fed onto the cable; the slug then must be manually removed from the cable.

More specifically, the aforementioned process requires that a jacket slug protect the shield strands from damage as a solder sleeve is threaded onto a cable. The inner diameter of a solder sleeve is highly variable down the length of the solder sleeve due to the internal components contained within the sleeve, including the solder ring, ground wire, and insulation rings. In addition, the tolerance values of solder sleeves are large, adding even more variability to the interior surface of the sleeves. This variability in addition to the interior components makes it difficult for a cable with exposed shielding to pass through a solder sleeve without strands of the shield being damaged, usually due to snagging on the edge of an internal component and crumpling as the cable is pushed through the sleeve. However, creating a jacket slug requires that the cable be scored twice in two different locations, and then removing the two segments of outer jacket in two separate steps. The manual process poses a higher risk of damaging the underlying shield and/or conductors, and is reliant on operator skill. Removing the protective slug also introduces a second point of strain on the shield and underlying conductors, as operators use tubing to manually pull off the slug once the solder sleeve has been fed onto the cable. Additionally, the time required to perform this step adds to the cycle time of the entire process. It would be advantageous to provide an automated solution that avoids damaging the exposed shield of the cable and reduces labor cost associated with processing and installing solder sleeves on shielded cables.

SUMMARY

The subject matter disclosed in some detail below is directed to providing fully automated (with automated feeding) solutions for installing a sleeve on a cable. For example, the apparatus and methods disclosed herein may be used to install a solder sleeve or a dead end sleeve on a portion of a shielded cable that includes a length of exposed shield. The automation of the sleeve installation operation enables repeatable and consistent quality across end products that is unachievable with a fully manual process.

One method disclosed in some detail below utilizes a funnel system and robotic end effector grippers to feed an unjacketed portion of a shielded cable through a solder sleeve. This method uses a specialized funnel system designed to accommodate the different sizes of sleeves. The funnel is designed with one or more thin extensions on which a solder sleeve is placed prior to a cable entering the funnel. The funnel extensions (hereinafter "prongs") may be attached to or integrally formed with the funnels. Preferably two or more prongs are employed, although a single prong may be used if properly configured to both guide a cable and fit between the sleeve and cable. The prongs close off the uneven surface internal to a sleeve and provide a smooth surface for the cable to slide along and through the sleeve, preventing any damage to the exposed shielding. The sleeve is picked up and held on the prongs using a robotic end effector. If the sleeve is a solder sleeve, the robotic end effector has grippers designed to make contact with the portions of the sleeve that are between the insulating rings and the central solder ring.

In accordance with some embodiments, the funnel has an open top. In such cases, the robotic end effector includes a cover that is a part of the end effector. This cover is designed to close off the opening in the funnel to ensure the cable passes fully through the funnel and through the sleeve during the insertion process. As the cable continues to travel through the sleeve, the end effector travels with the cable, maintaining the sleeve's central position over the exposed shield of the cable. Alternatively, the end effector repositions the sleeve over the shield once the cable has come to a stop; this operation brushes the shield strands down against the cable prior to the melting process. Once the sleeve has been positioned for processing, the end effector releases the sleeve and is removed from the processing area (e.g., a heating zone). A heat source can be moved into position to shrink the sleeve in place, or the sleeve can remain on the cable to be processed in a separate method. The cable is able to exit the funnel through the open slit that is no longer closed off by the end effector, and can then be retracted from the processing area. This method enables automation of the sleeve installation process, which reduces labor costs.

As used herein, the term "sleeve" means a tube made of shrinkable material, such as a solder sleeve made of thermoplastic material (which shrinks) and a solder ring (which melts) or a dead end sleeve made of thermoplastic material and having no solder ring. Installation of a solder sleeve involves shrinking of the thermoplastic material and melting of the solder ring; installation of a dead end sleeve involves shrinking of the thermoplastic material. As used herein, "melting a solder sleeve" includes shrinking the thermoplastic material with melting of a solder ring, while "shrinking a sleeve" includes shrinking the thermoplastic material with (e.g., solder sleeve) or without (e.g., dead end sleeve) melting of a solder ring.

In accordance with some embodiments proposed herein, the apparatus consists of a set of funnels designed to thread cables with exposed shields through solder sleeves. These funnels are designed with a slit opening that permits cables to exit the funnel without having to fully retract back through the funnel. The funnel system is designed such that a cable with exposed shielding can be fed through a solder sleeve without damaging the shield. For example, three different funnels may be designed to accommodate five different sizes of solder sleeves. A solder sleeve to be installed is fed onto the prongs extending from a funnel designed for that solder sleeve's size; the prongs are designed to have a diameter that is slightly smaller than the inside diameter of the solder sleeve, so that the sleeve can still slide over the prongs without the prongs taking up too much space inside the sleeve. The funnel and prongs are not completely closed; there is an opening that permits the cable to be removed from the system without passing the solder sleeve through the funnel. This feature accommodates cables to still be fed through a funnel prior to the time a solder sleeve is melted in place; the solder sleeve increases the overall outer diameter of the cable, so the cable is unable to pass back through the funnel again. However, the slit opening in the top of the funnel (hereinafter "open-top funnel") permits the cable to be lifted out of the funnel. The inside diameter of each funnel is sized large enough to accommodate any cable approved for a solder sleeve of a particular size.

The apparatus described in the immediately preceding paragraph further includes a robotic end effector comprising a pair of grippers designed to pick and place solder sleeves of multiple sizes. The grippers are configured to grip the portions of the solder sleeve that exist between the insulation rings and central solder ring, which features possess a larger outer diameter. By gripping the portions of the sleeve with a smaller outer diameter, the sleeve is held securely in place without slipping. Additionally, if it is desired to apply heat to the solder sleeve while it is held by the grippers, the portions of the solder sleeve requiring the least amount of heat to shrink are covered by the grippers, leaving the insulation rings and solder ring exposed.

The apparatus disclosed herein may be incorporated in an automated production line that includes a cable delivery system and a multiplicity of workstations situated accessible to the cable delivery system. In the automated production line, each workstation is equipped with a respective cable processing module (including hardware and software) that performs a respective specific operation in a sequence of operations designed to produce a shielded cable having a solder sleeve installed on one end of the cable. One of the workstations has the solder sleeve installation apparatus disclosed in detail below.

Although various embodiments of methods and apparatus for installing a sleeve on a cable will be described in some detail below, one or more of those embodiments may be characterized by one or more of the following aspects.

One aspect of the subject matter disclosed in detail below is an apparatus for installing a sleeve on a cable, the apparatus comprising: a funnel having a channel that narrows in width from an entry side to an exit side; a funnel extension attached to or integrally formed with the funnel and extending from the exit side of the funnel, the funnel extension comprising a prong configured to fit between a cable and a sleeve that surrounds the cable; a robotic arm; an end effector mounted to the robotic arm and configured to grip the sleeve when in a closed state; and a computer system configured to control movements of the robotic arm and a state of the end effector in accordance with a program in which the end effector picks up the sleeve, then places the sleeve on the prong and then, after a delay of sufficient duration to enable an end of the cable to pass through the funnel and the sleeve, moves the sleeve off the prong to a zone at a distance from the funnel extension.

The apparatus described in the immediately preceding paragraph may be used in various applications. For example, the apparatus may further comprise a heater capable of producing enough heat to melt material of the sleeve in a heating zone at a distance from the funnel extension, in which case the computer system is further configured to control the heater to produce heat in the heating zone sufficient to melt the sleeve on the cable. As used herein, the term "heating zone" means a volume of space which receives heat from the heater and is partly occupied by the sleeve and the portion of the cable inside the sleeve.

In accordance with some embodiments, the cable is a shielded cable having an exposed shield, the sleeve is a solder sleeve comprising a solder ring and a pair of insulating rings, and the solder sleeve is melted over the exposed shield. The end effector is configured to grip the solder sleeve between the solder ring and the insulating rings when in a closed state.

In accordance with one embodiment, the channel of the funnel is open, and the system further comprises: a linear actuator having a retracted state and an extended state; and a lever arm mounted to the linear actuator, the lever arm being movable upward along a path that engages the cable when the linear actuator transitions from the retracted state to the extended state, thereby lifting the cable out of the funnel extension. The computer is further configured to send a control signal to activate the linear actuator to transition from the retracted state to the extended state after the sleeve has been moved to the heating zone at a distance from the funnel.

Another aspect of the subject matter disclosed in detail below is an apparatus for processing a cable comprising: a heater capable of producing enough heat to melt a material in a form of a sleeve; a pair of wheels arranged to form a nip capable of moving a cable therethrough; a motor operatively coupled to at least one of the pair of wheels for driving rotation of the wheels; a funnel configured to guide the cable from an entry side to an exit side; a funnel extension attached to or integrally formed with the funnel and extending from the exit side of the funnel, the funnel extension comprising a prong configured to fit between the cable and the sleeve; and a computer configured to perform the following operations: activate the motor to drive rotation of the wheels in a cable pushing direction to cause a length of cable to be inserted into the funnel; control the heater to melt the sleeve on a portion of the length of cable that extends beyond the funnel extension; and activate the motor to drive rotation of the wheels in a cable pulling direction after melting the sleeve.

In accordance with some embodiments, the apparatus described in the immediately preceding paragraph further comprises: a robotic arm; an end effector mounted to the robotic arm and configured to grip the sleeve when in a closed state; and a robot controller configured to control movements of the robotic arm and a state of the end effector in accordance with a program in which the end effector picks up the sleeve, then places the sleeve on the prong and later removes the sleeve from the prong. In these embodiments, the apparatus further comprises a cover having one end attached to the end effector, wherein the prong has an open top and the cover is configured to cover the open top of the prong when the sleeve is placed on the prong.

In accordance with one embodiment, the funnel is a split funnel comprising first and second funnel halves, the split funnel having an open state in which the first and second funnel halves are separated by a gap and a closed state in which the first and second funnel halves are in contact with each other. In this case, the apparatus further comprises an actuator for selectively moving one or both of the first and second funnel halves to achieve a transition between the open and closed states. The computer is further configured to activate the actuator to move the first and second funnel halves away from each other before activating the motor to drive rotation of the wheels in the cable pulling direction.

A further aspect of the subject matter disclosed in detail below is a method for processing a shielded cable comprising: (a) robotically picking up a sleeve, transporting the sleeve to a vicinity of first and second prongs of a funnel extension, and placing the sleeve on the first and second prongs; (b) passing an end of the cable through a funnel, between the first and second prongs and through the sleeve until a specified portion of the cable is positioned in a processing zone separated from the ends of the first and second prongs by a distance; (c) robotically moving the sleeve from a position in contact with the first and second prongs to a position in the processing zone whereat the sleeve surrounds the specified portion of the cable; and (d) processing the sleeve in the processing zone while the sleeve surrounds the specified portion of the cable. Step (c) may occur after (the sleeve is moved after the cable has stopped moving) or during step (b) (the sleeve and surrounded portion of the cable are moved in unison to the processing zone). In one application, step (d) comprises generating heat in the processing zone until the sleeve melts on the cable.

In accordance with some embodiments of the method described in the immediately preceding paragraph, the funnel has an open top, and the method further comprises lifting the cable up until no portion of the cable is between the first and second prongs. In accordance with other embodiments, the funnel comprises funnel halves, and the method further comprises separating the funnel halves to enable the melted sleeve to pass between the separated funnel halves when the cable is retracted.

Yet another aspect of the subject matter disclosed in detail below is a method for processing a shielded cable, the method comprising: placing a portion of the shielded cable between a pair of wheels that form a nip; robotically placing a sleeve on an extension of a funnel having an entry side that faces the nip; driving rotation of the wheels in a cable pushing direction to cause an end of the shielded cable to move through the funnel until an exposed shield of the shielded cable is positioned in a heating zone at a distance from the funnel; robotically moving the sleeve from the extension of the funnel to a position in the heating zone; and heating the sleeve in the heating zone until material of the sleeve is melted over the exposed shield.

Other aspects of methods and apparatus for installing a sleeve on a cable are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

In addition, the depiction of shielded cabling in the drawings has been simplified by assuming that the cable being viewed in the drawing has a circular outer profile of constant diameter along its length, although some shielded cabling having a jacket that conforms to the undulations in the electrical wires has an outer profile that varies along its length.

FIG. 1 is a diagram representing and identifying components of an automated system for performing respective operations on an end of a cable at a plurality of cable processing modules in accordance with one embodiment.

FIG. 7A is a diagram representing a side view of the solder sleeve having a pre-installed ground wire.

FIG. 7B is a diagram representing a side view of the solder sleeve depicted in FIG. 7A when overlying a portion of the cable that includes exposed shielding.

FIG. 7C is a diagram representing a side view of the solder sleeve depicted in FIG. 7A when installed by melting on the portion of the cable that includes exposed shielding.

FIGS. 8A and 8B are diagrams representing a side view of a portion of a sleeve-cable assembly having an "out front" solder sleeve before (FIG. 8A) and after melting (FIG. 8B).

FIGS. 9A and 9B are diagrams representing a side view of a portion of a sleeve-cable assembly having an "out back" solder sleeve before (FIG. 9A) and after melting (FIG. 9B).

Reference will hereinafter be made to the drawings in which similar elements in different drawings bear the same reference numerals.

DETAILED DESCRIPTION

Figure 2A:
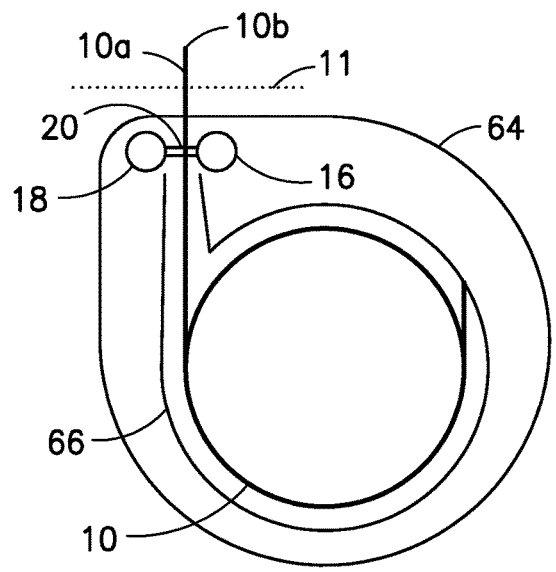
FIGS. 2A and 2B are diagrams representing top views of a cable-carrying, drive wheel-equipped pallet in two states: when the drive wheel is separated from an idler wheel (FIG. 2A) and when the drive wheel is in contact with the idler wheel (FIG. 2B).

Illustrative embodiments of methods and apparatus for installing a sleeve on a cable are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, various embodiments of an apparatus for installing a solder sleeve on a shielded cable will now be described. Such an apparatus may be included in cable processing equipment at one or more modules at separate workstations in a fully automated production line or may be benchtop cable processing equipment (e.g., equipment mounted on a workbench and accessible to a human operator).

As used herein, the term "tip of a cable" means a portion of a cable exposed by cutting the cable in a cross-sectional plane. As used herein, the term "end of a cable" means a section of cable having a tip and a length of cable extending from the tip. For example, removal of a length of the jacket of a cable that extends to the cable tip creates an end of the cable in which the shielding is exposed.

FIG. 1 is a diagram representing and identifying components of a system 110 for performing respective operations on an end of a cable 10. The system 110 includes a cable delivery system 60 cable delivery system 60. For example, the cable delivery system 60 may take the form of a conveyor system with locating modules (not shown in FIG. 1). Locating modules are components for positioning pallets in preparation for performance of an automated operation. In accordance with the embodiment depicted in FIG. 1, the cable delivery system 60 cable delivery system 60 includes a conveyor track 62 in the form of an endless belt or chain. The entire conveyor track 62 is continuously moving. In alternative embodiments, the cable delivery system 60 is not endless, in which case pallets 64 arriving at the end of a linear conveyor track may be transported to the starting point by other means. In accordance with alternative embodiments, the cable delivery system 60 may be a gantry robot or a robotic arm.

The system 110 depicted in FIG. 1 further includes a multiplicity of automated workstations situated adjacent to and spaced at intervals along the conveyor track 62. Each workstation is equipped with hardware that performs a respective specific operation in a sequence of operations designed to produce a shielded cable 10 having a solder sleeve 12 installed on one end of the cable 10. The locating modules (not shown in FIG. 1) of the system 110 are used to lift each pallet 64 off of the conveyor track 62 when an operation has to be performed at a workstation on the coil carried by that pallet 64 and later place the pallet 64 back on the conveyor track 62 after the operation has been completed so that the pallet 64 can move onto the next workstation.

Each pallet 64 carries a respective coil of cable 10. Pallets 64 move intermittently along the conveyor track 62 in the forward direction indicated by the arrows in FIG. 1, advancing from one automated workstation to the next and then stopping. (This aspect of the cable delivery system 60 will be referred to hereinafter as "pulsing".) A respective bar code reader (not shown in the drawings) is mounted on the side of the conveyor track 62 opposite to each workstation. Each pallet 64 has a bar code printed on a forward side portion thereof. When the bar code reader detects the arrival of a pallet 64, each workstation has a respective controller (e.g., a computer programmed to execute computer numeric control (CNC) commands) that activates the cable processing module of that workstation to begin an automated cable processing operation.

Each shielded cable 10 to be processed is carried on a respective pallet 64 that is conveyed along the conveyor track 62. The pallets 64 pulse down the conveyor track 62 and the end of each shielded cable 10 is inserted into a series of cable processing modules in sequence, each cable processing module including cable processing equipment for performing successive operations of a solder sleeve installation process. In accordance with the embodiment depicted in FIG. 1, the cable processing modules include the following: a de-reeler module 32, a laser marker 34, a coiler module 36, a cable tip positioning module 38, a laser scoring module 40, a jacket slug pulling module 42, a shield trimming module 44, a shield trim inspection module 46, two solder sleeve installation modules 52 and 54 (also referred to herein as "solder sleeve pick, place and melt modules"), and a ground wire detection module 58. In accordance with the proposed implementation depicted in FIG. 1, there are three open positions where cable processing does not occur. These open positions, where a pallet may be parked, are referred to herein as buffers 48, 50 and 56.

As indicated in FIG. 1 by triangle symbols, some of the workstations include funnels 22 which center the inserted end of the cable 10 in the cable processing equipment at the respective workstation. Other workstations, such as the workstation where the cable tip positioning module 38 is located, do not have a funnel. The workstations where the two solder sleeve installation modules 52 and 54 are located have open-top funnels 170, which also guide the end of the cable 10, but differ in structure from the funnels 22 in that the cable may be lifted vertically out of the open-top funnel 170 upon completion of the solder sleeve melting operation. In accordance with alternative embodiments described in some detail later, split funnels 171 of the type depicted in FIGS. 19A and 19B may be used.

Each of the automated cable processing operations identified in FIG. 1 will now be briefly described in some detail. The respective cable processing modules will be described in the order in which the respective cable processing operations are performed on one cable.

The starting material is a continuous length of multi-conductor shielded cable of a particular type wound on a reel. The de-reeler module 32 de-reels the continuous length of cable and then cuts the cable to a specified length, which length of cable will be referred to hereinafter as "cable 10". Preferably a multi-spool de-reeler is used so that multiple cable types can be selected for processing off of a single machine. For each length of cable 10, the laser marker 34 laser marks the outer jacket 2 of the cable 10 with pertinent information (bundle number, wire number, gauge).

The coiler module 36 receives each length of cable 10 from the de-reeler module 32 and laser marker 34 and coils the cable 10. This creates a repeatable configuration for the cable that is easy to transport and maintain as it goes through the system. The coiler module 36 coils cables 10 and applies a sticker label. This label contains information about the cable (e.g., airplane effectivity, bundle, dash, wire identification, etc.), as well as a bar code. In accordance with one proposed implementation, the coiler module 36 ensures that one end of the coiled cable 10 has seven inches of "free" cable.

The coil of cable 10 is taken off of the coiler and placed on a pallet 64. The pallet 64 is then transferred from the coiler module 36 to the cable tip positioning module 38. This may be done manually by an operator or automatically by a robotic end effector (or some other apparatus).

The cable tip positioning module 38 serves to initially position the tip of the cable 10 at a preset cable tip position prior to the cable 10 continuing through the system 110. It is the first "stop" along the conveyor track 62, and is where the cable 10 is first placed onto the system. The preset cable tip position is selected to prevent the cable end from being too long as it travels along the conveyor track (hitting other objects within the system, being crushed or otherwise damaged, etc.). After the cable tip positioning module 38 has positioned the cable tip 10b at the preset cable tip position, the pallet 64 leaves the cable tip positioning module 38.

In accordance with the embodiment depicted in FIG. 1, after the cable tip positioning module 38 has positioned the cable tip 10b, the pallet 64 moves to the laser scoring module 40. The workstation where the laser scoring module 40 is located also includes a funnel 22 for guiding a cable 10 into the cable processing equipment of the laser scoring module 40. The laser scoring module 40 lightly scores the jacket 2 of the cable 10 along a score line 3 which extends circumferentially in a plane that intersects an annular region of the jacket 2. The presence of the laser score line 3 prepares the applicable segment of jacket 2 (hereinafter "the jacket slug 2a") to be removed.

After the laser scoring module 40 has scored the jacket 2 of the cable 10, the pallet 64 moves to the jacket slug pulling module 42. The workstation where the jacket slug pulling module 42 is located also includes a funnel 22 for guiding a cable 10 into the cable processing equipment of the jacket slug pulling module 42. The jacket slug pulling module 42 removes the jacket slug 2a to reveal the shield 4 in the unjacketed portion of the cable 10. An electrical continuity shield sensor (not separately depicted in FIG. 1) may be integrated with the jacket slug pulling module 42 to detect that the jacket slug 2a was removed prior to retracting the cable 10 from the jacket slug pulling module 42.

After the jacket slug pulling module 42 has pulled off the jacket slug 2a of the cable 10, the pallet 64 moves to the shield trimming module 44. The workstation where the shield trimming module 44 is located also includes a funnel 22 for guiding a cable 10 into the cable processing equipment of the shield trimming module 44. The shield trimming module 44 trims off a portion of the exposed portion of the shield 4 to reveal respective portions of the wires 6 and 8 of the cable 10. In accordance with one proposed implementation, the shield trimming module 44 trims the shield 4 of the cable 10 about 0.25" from the edge of the jacket 2.

After the shield trimming module 44 has trimmed the shield 4 of the cable 10, the pallet 64 moves to the shield trim inspection module 46. The workstation where the shield trim inspection module 46 is located also includes a funnel 22 for guiding a cable 10 into the cable processing equipment of the shield trim inspection module 46. The shield trim inspection module 46 performs a quality check of the trimmed shield using a vision inspection system. The quality check ensures that the shield 4 meets the specifications for the particular type of cable 10 (e.g., shield strands are not too long or too short, not damaged, etc.) prior to installing a solder sleeve 12.

After the shield trim inspection module 46 has inspected the trimmed shield 4 of the cable 10, the pallet 64 moves to one of two solder sleeve installation modules 52 and 54. The workstations where the solder sleeve installation modules 52 and 54 are located also include an open-top funnel 170 for guiding a cable 10 into the cable processing equipment of the solder sleeve installation modules 52 and 54. The solder sleeve installation modules 52 and 54 are configured to install a solder sleeve 12 with a ground wire 14 onto the cable 10 using automated picking, placing and melting operations. Each solder sleeve installation modules preferably includes a sensor system that actively measures the diameter of the cable with solder sleeve and monitors the shrinking diameter of the solder sleeve during the melting process using dimensional analysis. The sensor system activates or deactivates the heating element based on the dimensional analysis of the solder sleeve; this may also control the transportation of the cables through the device.

Solder sleeves are limited in how quickly they are able to fully melt without burning due to their design and materials. The type of heat source used (hot air, infrared) has no significant impact on the melt time. This creates a bottleneck on the moving line, due to the fact that all processes prior to the solder sleeve melting operation take much less time to complete, and limits the lowest achievable cycle time of the overall line.

In accordance with one proposed implementation, two cables 10 may have solder sleeves installed concurrently using the two solder sleeve installation modules 52 and 54. After the solder sleeve 12 has been installed on the cable 10 by one of the solder sleeve installation modules 52 and 54, the pallet 64 moves to ground wire detection module 58. The workstation where the ground wire detection module 58 is located also includes a funnel 22 for guiding a cable 10 into the cable processing equipment of the ground wire detection module 58. The ground wire detection module 58 detects the ground wire 14 of the solder sleeve 12. This may be done through physical sensing or an electrical continuity test, all of which are commercially available off the shelf.

As seen in FIG. 1, the cable delivery system 60 includes multiple pallets 64 that travel on the conveyor track 62, each pallet 64 carrying a respective coil of cable 10. In accordance with some embodiments, the apparatus on the pallet 64 includes a pair of cable-displacing wheels (e.g., a motor-driven drive wheel and a spring-loaded idler wheel that is movable between positions that are respectively in contact with and not in contact with the motor-driven drive wheel) designed to push and pull cables through a cable-guiding funnel which centers the cable for insertion into the cable processing equipment. The ability of the drive and idler wheels to move apart enables wires or cables of varying diameters and cross-sectional profiles to be placed between the drive and idler wheels. This apparatus is intended to be universal, i.e., to be able to be used on any equipment (including benchtop equipment) that processes wires and/or cables. Additionally, a user would be able to define the amount (length) of cable that is fed into the equipment, depending on the cable that is to be processed and its related requirements.

Figure 2B:
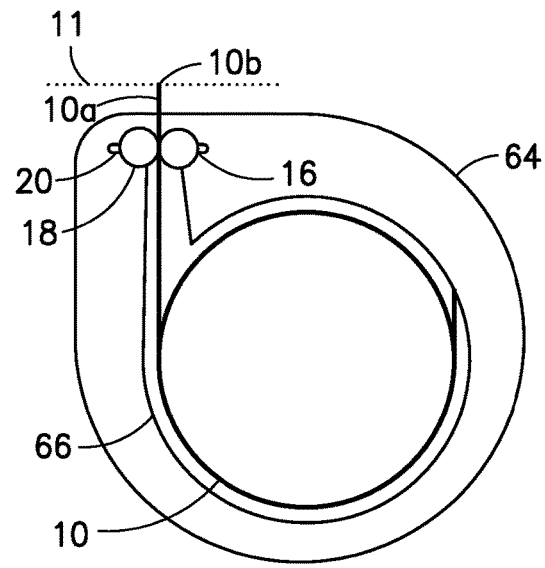

Some features of a pallet 64 in accordance with one embodiment will now be described with reference to FIGS. 2A and 2B; other features of the pallet 64 not shown in FIGS. 2A and 2B will be described later with reference to other drawings. As seen in FIGS. 2A and 2B, each pallet 64 has a drive wheel 16 and an idler wheel 18 which are rotatably coupled to the pallet 64. The drive wheel 16 and idler wheel 18 are preferably padded with a compliant material capable of conforming to different cross-sectional profiles (e.g., single- versus multi-conductor cable). An encoder may be attached to one or both of the wheels in order to more accurately track how far the cable 10 has been moved by the wheels. The encoder tracks the "distance traveled" of a drive roller by multiplying the number of rotations by the circumference of the drive wheel 16.

The pallet 64 also includes a corral 66 in the form of a curved wall that is contoured to guide the cable end 10a toward the drive wheel 16 and idler wheel 18. The drive wheel 16 and idler wheel 18 cooperate to move the cable end 10a into and out of an adjacent cable processing module 30. FIGS. 2A and 2B show the pallet 64 in two states: when the drive wheel 16 is separated from the idler wheel 18 (FIG. 2A) and when the drive wheel 16 is in contact with the idler wheel 18 (FIG. 2B).

As seen in FIG. 2A, the free end 10a of the cable 10 is placed between the drive wheel 16 and idler wheel 18 so that the cable tip 10b is at a position in front of the nip, while the cable 10 is intersected by a vertical scanning plane 11 (indicated by a dashed line in FIGS. 2A and 2B) located at a known position. This known position is a known distance from a preset cable tip position. Although FIG. 2A shows the cable tip 10b located beyond the vertical scanning plane 11, the starting position of the cable tip 10b may be either beyond or short of the vertical scanning plane 11.

The force holding the idler wheel 18 apart from drive wheel 16 is then discontinued, following which the idler wheel 18 is urged by springs (not shown in FIGS. 2A and 2B) into contact with the drive wheel 16, thereby forming a nip that squeezes the shielded cable 10. As will be described in further detail below, the drive wheel 16 and idler wheel 18 are configured so that sufficient frictional forces are produced that enable the shielded cable 10 to be either pushed or pulled through the nip depending on the directions of wheel rotation. Upon detection of the presence of the cable tip 102b at a position beyond the vertical scanning plane 11, the drive wheel 16 and idler wheel 18 are rotated in a cable pulling direction to cause the cable end 10a to retract and the cable tip 10b to move toward the vertical scanning plane 11. Conversely, if the cable tip 102b were at a position short of the vertical scanning plane 11 (hereinafter "scanning plane 11"), the drive wheel 16 and idler wheel 18 would be rotated in a cable pushing direction to cause the cable end 10a to extend and the cable tip 10b to move toward the scanning plane 11. The remainder of the description of FIGS. 2A and 2B will discuss the case wherein the cable end 10a is initially placed in a position such that the cable tip 102b is beyond (not short of) the scanning plane 11

The movement of the cable tip 10b is monitored by detecting when the cable tip 10b reaches the scanning plane 11. This is accomplished by a photoelectric sensor (not shown in FIGS. 2A and 2B, but see photoelectric sensor 28 in FIGS. 4A and 4B) mounted to the pallet 64 and configured to function as a light gate. In accordance with some embodiments, the photoelectric sensor 28 is configured to act as a light gate that detects when there is no portion of the cable 10 blocking a light beam propagating in the scanning plane 11 from one side of the light gate to the other side. FIG. 2B shows the state wherein the cable tip 10b is aligned with the scanning plane 11 following retraction of the cable end 10a. In response to the photoelectric sensor 28 detecting a transition between a state of light being interrupted (e.g., blocked) in the scanning plane 11 and a state of light not being interrupted, the photoelectric sensor 28 issues a cable tip position signal indicating the transition between interruption and no interruption of transmitted light at the scanning plane. In response to issuance of the cable tip position signal, the computer of the cable positioning module activates a motor (not shown in FIGS. 2A and 2B, but see motor 72 in FIGS. 4A and 4B) to rotate the drive wheel 16 an amount and in a direction such that at the end of the rotation, the cable 10 does not extend beyond a preset cable tip position. This preset cable tip position is a known distance from the scanning plane 11. The preset cable tip position may be selected to ensure that the cable tip 10b may travel along the conveyor track 62 with sufficient clearance to avoid damage from stationary objects.

Figure 3:
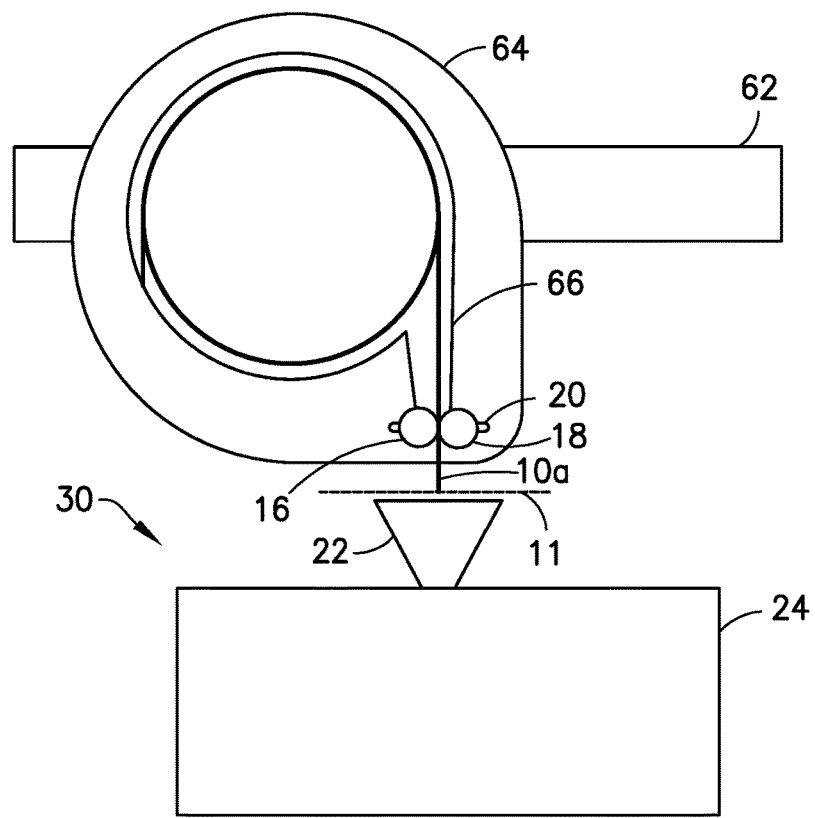
FIG. 3 is a diagram representing a top view of the pallet depicted in FIG. 2B in a position adjacent a cable processing module where a tip of the cable is positioned in front of a funnel.

The cable tip positioning module 38 includes a computer system (not shown in FIG. 3. The cable tip positioning signal from the photoelectric sensor 28 is received by the computer 162a. The computer 162a is configured to de-activate the motor 72 that drives rotation of the drive wheel 16 (thereby ceasing driving rotation of the drive wheel 16 in the cable pulling direction) after a predetermined angular rotation of the drive wheel 16 subsequent to issuance of the cable tip position signal. In other words, there is a time delay during which the drive wheel 16 and idler wheel continue to move the cable end 10a, causing the cable tip 10b to move from the current position depicted in FIG. 2B (in this instance, corresponding to the position of the scanning plane 11) to a preset cable tip position a short distance (e.g., 0.5 inch) from the scanning plane 11. More specifically, the computer 162a is configured to start a count of pulses output by a rotation encoder (mounted on the drive wheel shaft 88 or the motor output shaft, for example) in response to issuance of the cable tip position signal and then de-activate the motor 72 in response to the count reaching a specified value representing the distance separating the preset cable tip position from the scanning plane 11.

In accordance with an alternative embodiment, the preset cable tip position and the position of the scanning plane may be one and the same, provided that the movement of the cable 10 can be stopped precisely at the instant in time when the photoelectric sensor 28 issues the cable tip position signal.

The above-described cable tip positioning process ensures that the cable tip 10b is in a repeatable position and does not extend beyond the preset cable tip position prior to continuing down the conveyor track 62. At this juncture, the conveyor track 62 pulses forward, causing the pallet to move to the next workstation.

FIG. 3 is a diagram representing a top view of the pallet 64 in a position adjacent a cable processing module 30. The apparatus includes a drive wheel 16 and an idler wheel 18 configured for driving the cable 10 forwards or backwards between the wheels and a funnel 22 capable of capturing the cable end 10a. While the wheels control the motion of the cable 10, the funnel 22 serves to center the cable 10 for insertion into the cable processing equipment. This function will be used to insert and position the cable 10 into different modules for processing as the cable 10 is transported through the system.

More specifically, the cable tip 10b is positioned in front of a funnel 22 that is configured to center a cable end 10a as it is fed into the cable processing equipment 24 of a cable processing module 30. Each cable processing module 30 is equipped with a funnel 22 (or an open-top funnel not shown) and a photoelectric sensor (not shown in FIG. 3, but see photoelectric sensor 28 in FIG. 5) for detecting the presence of the cable tip 10b in a scanning plane 11 (indicated by a dashed line in FIG. 3). It is important that the interior surface of the funnel 22 be smooth and devoid of any rough or sharp edges that may abrade, tear, or otherwise damage the cable 10. Preferably the funnel 22 is made of a thermoplastic material with a low coefficient of friction to prevent the funnel 22 from slowing the cable 10 down as it is moved by the drive wheel 16 and idler wheel 18 (preventing slippage). The funnel 22 may be configured in different ways. In lieu of a basic hole on the exit side of the funnel 22 (small diameter side), the funnel 22 may have a flexible piece of material featuring an X-shaped cut centered within the funnel 22. This helps to provide a repeatable, centered position for the cable 10 as it is either pushed forward or pulled back. It also permits the cable-guiding funnel to accurately center cables with varying diameters and cross sectional profiles. Other cable-guiding funnels may also be split and/or feature an open top.

Figure 4A:
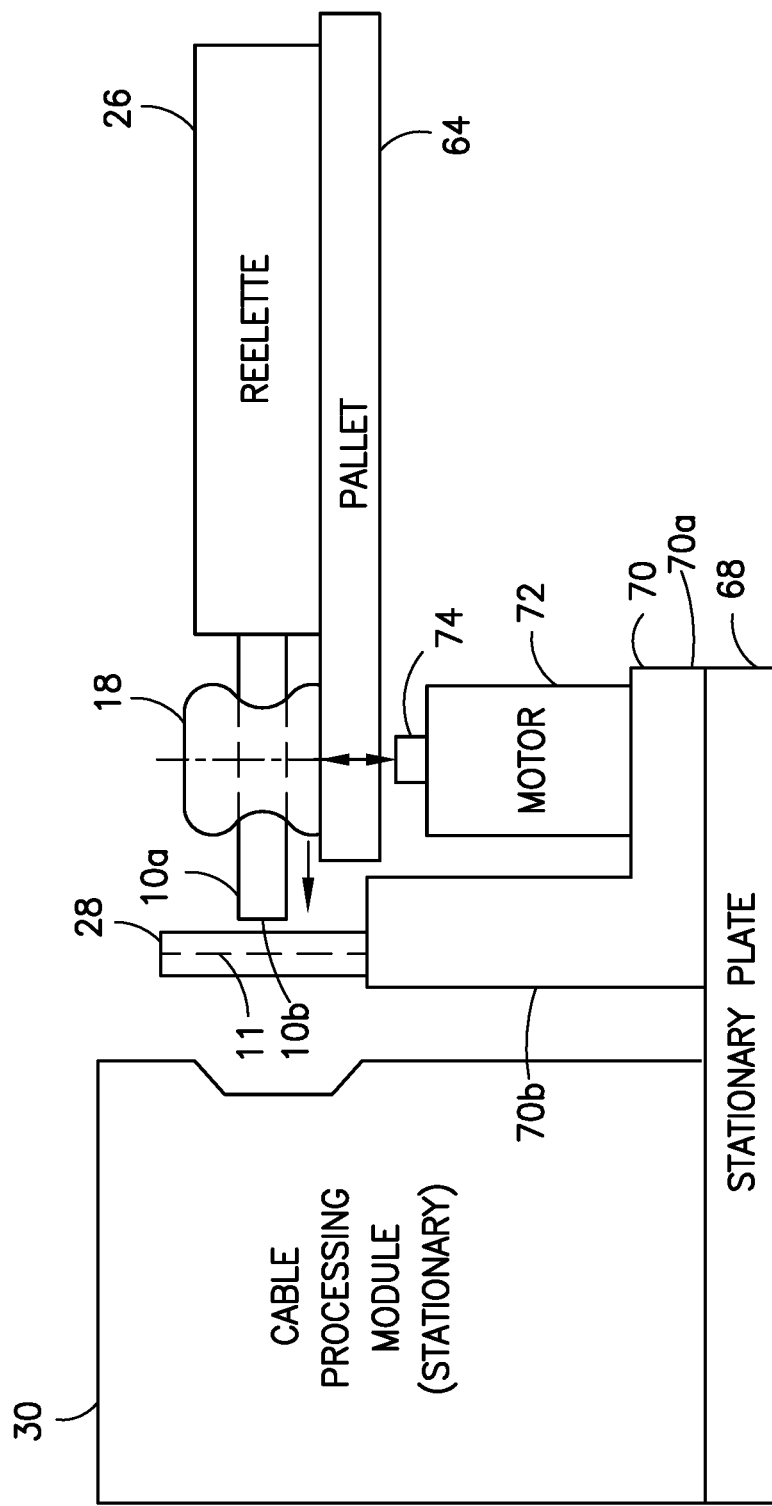
FIG. 4A is a diagram representing a side view of a cable-carrying, drive wheel-equipped pallet in a position adjacent a cable processing module.
Figure 4B:
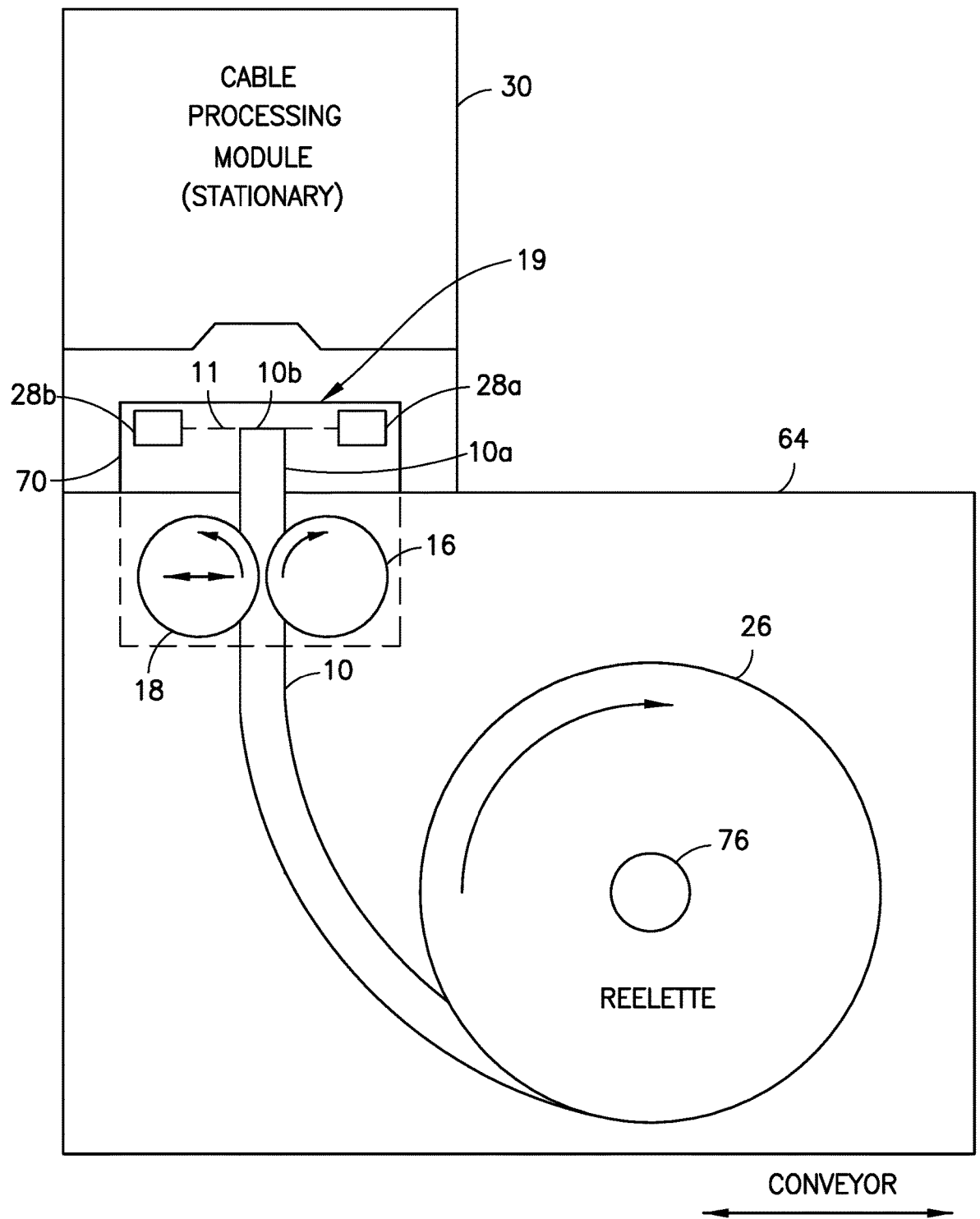
FIG. 4B is a diagram representing a top view of the apparatus depicted in FIG. 4A.

In accordance with some embodiments, each workstation includes a stationary motor (not shown in FIG. 3, but see motor 72 in FIGS. 4A and 4B). In accordance with one proposed implementation, the motor 72 is an electric stepper motor. The motor shaft speed will control how fast the drive wheel rotates (the speed at which the end of the cable 10 is moved), as well as which directions the wheels rotate in. The motor 72 is configured to rotate either clockwise or counterclockwise.

In response to detection of the arrival of the pallet 64 at the cable processing module 30 by a pallet detector (not shown in FIG. 3, but see pallet detector 160 in FIG. 5), the motor 72 is operatively coupled to the drive wheel 16. Subsequently the motor 72 is activated to drive the drive wheel 16 to rotate in the cable pushing direction. The shaft of the motor 72 is optionally equipped with a rotation encoder 73 (see FIG. 5) for determining the angular rotation of the drive wheel 16. During rotation of the drive wheel 16 in the cable pushing direction, the rotation encoder 73 tracks the rotation of the motor shaft to generate digital position information representing the length of cable 10 which has been fed past the scanning plane 11.

When a pallet 64 stops at the cable processing module 30, the drive wheel 16 and idler wheel 18 are driven to rotate in a cable pushing direction to cause the cable tip 10b to pass the photoelectric sensor 28, through the funnel 22, and into the cable processing equipment 24. Once the photoelectric sensor 28 is triggered, the rotation encoder 73 will begin to record the position of the cable tip 10b. This provides a way to track the inserted length of the cable 10 in real time, and subsequently cause the motor 72 to stop once the correct length of cable 10 has been fed into the cable processing equipment 24. The drive wheel 16 and idler wheel 18 continue to rotate in the cable pushing direction until a specified length of cable 10 has been inserted into the cable processing equipment 24 via the funnel 22.

FIG. 4A is a diagram representing a side view of a pallet 64 in a position adjacent a cable processing module 30, which pallet 64 is equipped with a reelette 26 for holding a coil of cable 10 and a drive wheel 16 (not visible in FIG. 4A) for feeding an end of the cable 10 into the cable processing module 30 in accordance with a further embodiment. FIG. 4B shows a top view of the pallet 64 in a position adjacent the cable processing module 30. The pallet 64 further includes a cable positioning mechanism 19 that is controlled to place the tip 10b of the cable 10 at a repeatable position at each cable processing module 30.

As seen in FIG. 4A, the cable processing module 30 is mounted on a stationary plate 68. A stanchion 70 is affixed to the stationary plate 68 in a position in front of the cable processing module 30. A motor 72 is mounted to a base 70a of the stanchion 70. The motor 72 has an output shaft 74 which drives rotation of the drive wheel 16 (not visible behind the idler wheel 18 in FIG. 4A). In addition, a photoelectric sensor 28 is mounted to an upright portion 70b of the stanchion 70. The photoelectric sensor 28 is placed at an elevation such that the photoelectric sensor 28 is able to detect the cable tip 10b when it passes through a scanning plane 11 (indicated by a dashed line in FIGS. 4A and 4B) during cable pushing.

In accordance with the embodiment depicted in FIG. 4A, each coil of cable 10 is individually wound onto its own reelette 26, which reelette 26 is supported by and rotatably coupled to the pallet 64. The corral 66 (see in FIGS. 2A, 2B, and 3) is not shown in FIG. 4A so that the reelette 26 is visible. The reelette 26 has an opening (not shown in FIG. 4A) on its outer periphery through which a portion of the cable 10 (including cable end 10a) passes. FIG. 4A shows a state in which the cable end 10a is disposed between rotating drive wheel 16 and idler wheel 18 (drive wheel 16 is located directly behind the idler wheel 18 and not visible in FIG. 4A), while the cable tip 10b is moving in a direction (indicated by an arrow in FIG. 4A) toward the cable processing module 30.

FIG. 4B shows a top view of the pallet 64 when the cable tip 10b is positioned at a scanning plane 11 of the photoelectric sensor 28. The double-headed straight arrow superimposed on the idler wheel 18 indicates that the idler wheel 18 is laterally movable away from and toward the drive wheel 16. Meanwhile the curved arrows superimposed on the drive wheel 16 and idler wheel 18 are intended to indicate that the drive wheel 16 and idler wheel 18 are rotating in a cable pushing direction. At the instant of time depicted in FIG. 4B, the cable tip 10b is positioned at the scanning plane 11 and is moving toward the cable processing module 30.

Figure 5:
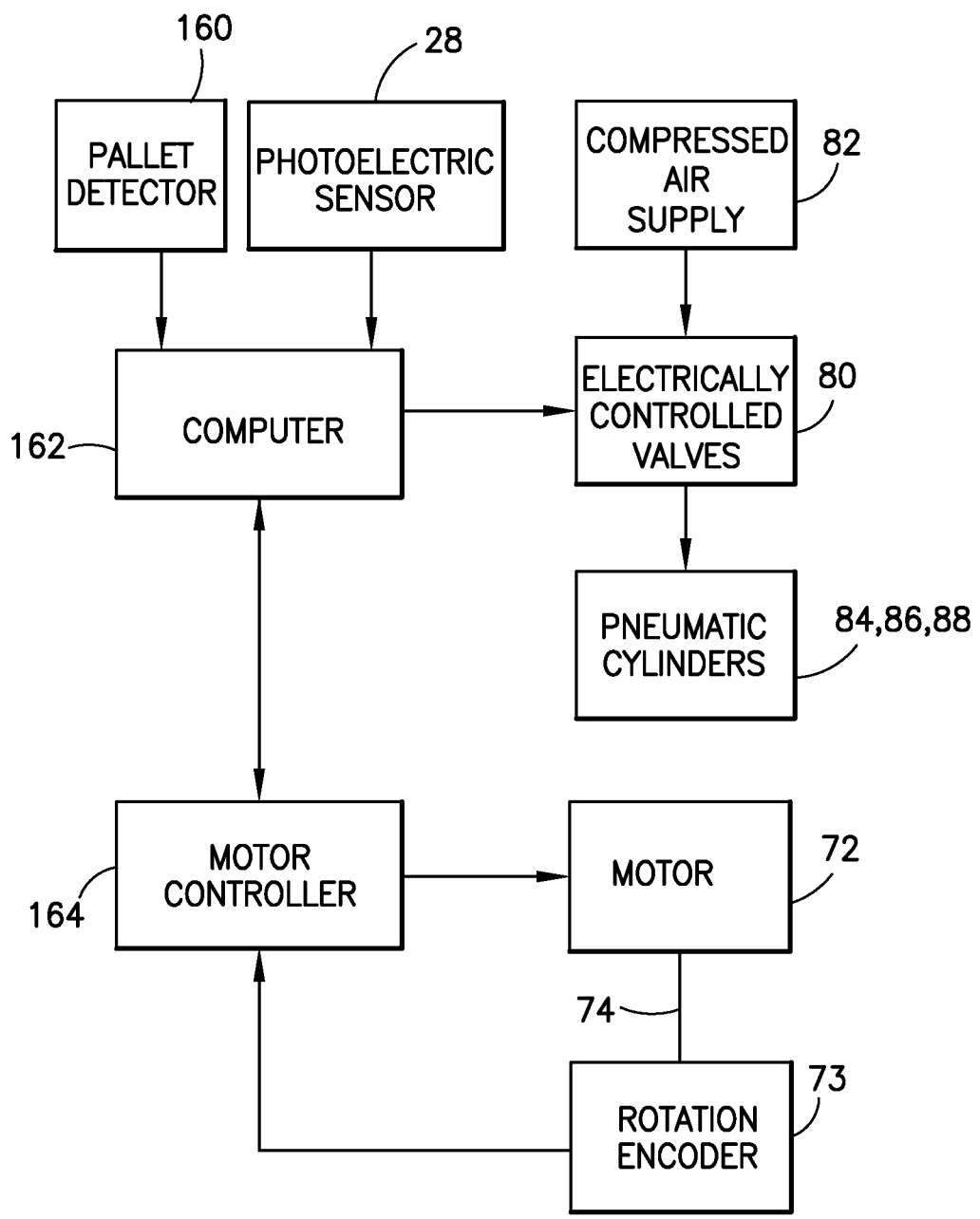
FIG. 5 is a block diagram identifying components of a cable processing workstation in accordance with one embodiment.

The cable processing module 30 includes a computer (not shown in FIGS. 4A and 4B) FIG. 5 is a block diagram identifying some components of a cable processing workstation in accordance with one embodiment. As previously described, each cable processing workstation includes a funnel 22 and cable processing equipment 24 (not shown in FIG. 5, but see FIG. 3). The cable processing workstation further includes a computer 162 that is configured to control various actuators and motors by executing pre-programmed sequences of machine control commands, such as computer numerical control commands. FIG. 5 depicts an example wherein the computer 162 is programmed to send control signals to various electrically controlled valves 80 which may be opened to supply compressed air from a compressed air supply 82 to one or more of a multiplicity of pneumatic cylinders 84, 86 and 88. The pneumatic cylinders 84, 86 and 88 may be used to move various components of the cable processing equipment 24. In alternative embodiments, the pneumatic cylinders may be replaced by electric motors.

The cable processing workstation depicted in FIG. 5 further includes a motor 72 and a rotation encoder 73 operatively coupled to the output shaft 74 of the motor 72. The rotation encoder 73 generates pulses which the computer 162 is configured to count for the purpose of determining the number of degrees of motor output shaft rotation, which angular measurement in turns represents a distance traveled by the cable tip 10b during that output shaft rotation. The computer 162 also receives sensor feedback from a photoelectric sensor 28 used to detect a cable tip position and a pallet detector 160 used to detect a pallet position. The computer 162 is configured to send commands to a motor controller 164 for controlling the motor 72 in accordance with feedback from photoelectric sensor 28, rotation encoder 73 and pallet detector 160.

The computer 162 of each cable processing module 30 is configured to perform the following operations: activate the motor 72 to drive rotation of the drive wheel 16 in a cable pushing direction to cause a specified length of cable 10 to be inserted into the cable processing equipment 24; activate the cable processing equipment 24 to perform an operation on the inserted cable end 10a; and activate the motor 72 to drive rotation of the drive wheel 16 in a cable pulling direction to cause the specified length of cable 10 to be removed from the cable processing equipment 24.

Each workstation comprises a rotation encoder 73 configured to output pulses representing the incremental angular rotations of an output shaft of the motor 72. The photoelectric sensor 28 is positioned and configured to issue a cable tip position signal indicating that interruption of transmitted light in the scanning plane 11 has started. In other words, the cable tip position signal is issued in response to the photoelectric sensor 28 detecting that a state of light not being blocked in the scanning plane 11 has transitioned to a state of light being blocked. The computer 162 is further configured to start a count of pulses output by the rotation encoder 73 in response to the cable tip position signal and then de-activate the motor 72 in response to the count reaching a specified value corresponding to a specific target length of cable 10 having been inserted in the cable processing equipment 24.

The photoelectric sensor 28 that detects the position of the cable tip 10b in each cable processing module 30 may be of the same type as the photoelectric sensor 28 incorporated in the cable tip positioning module 38. For example, digital laser sensors of various types are suitable. Many adaptable options are available off the shelf, such as proximity sensors and vision sensors.

In accordance with some embodiments, the photoelectric sensor 28 used to detect cable tip position is of a type that is also capable of measuring the diameter of the cable 10 to ensure that false positives are not caused by fingers or other objects larger than the typical cable diameter. The diameter measurement may also be used to confirm that the cable 10 is of the type expected by the computer 162 of the cable processing module 30.

In accordance with one proposed implementation, the photoelectric sensor 28 is a laser sensor of the "position recognition" type (a.k.a. a laser scan micrometer). In a laser scanner of this type, a scanning laser beam is emitted from a scanning light beam transmitter 28a, which scanning light beam scans in the scanning plane 11 and is then received by the light-detecting sensor 28b. In accordance with one embodiment, the light-detecting sensor 28b includes a linear array of light-detecting elements (e.g., a column of pixels in a charge coupled device). The area where the scanning laser beam is interrupted is identified clearly on the light-detecting sensor 28b. This type of laser sensor may be used for in-line cable tip position detection or cable outer diameter measurement.

The computer 162 of the cable processing module 30 is further configured to perform the following operations: compute a length of an interruption in light received by the light-detecting sensor 28b from the scanning light beam transmitter 28a; compare the computed length of the interruption to reference data representing a diameter of the type of cable 10 to be processed; and issue an alert signal when a difference of the computed length of the interruption and the reference data exceeds a specified threshold.

In accordance with other embodiments, the above-described cable positioning system may be used to position the tip of the cable at multiple positions within any given processing module. Such feature allows multi-step processing within a single module. The tip of the cable, for example, could be positioned at multiple positions within the laser scoring module 40 to allow the laser to score the cable in multiple locations. For very long strip lengths (four inches for example) the cable could be laser scored every inch. The jacket slug pulling module 42 would then pull of each one-inch slug one at a time (again using multi-step insertion). Thus the jacket puller only needs to overcome pull-off friction forces for one inch of jacket instead of four inches of jacket.

Referring again to FIG. 1, after the jacket slug pulling module 42 has pulled off the jacket slug 2a of the cable 10, the pallet 64 moves to the shield trimming module 44. The shield trimming module 44 incorporates equipment for trimming off a portion of the exposed portion of the shield 4 to reveal respective end portions of the wires 6 and 8 of the cable 10. After the shield trimming module 44 has trimmed the shield 4 of the cable 10, the pallet 64 moves to the shield trim inspection module 46 (see FIG. 1). The shield trim inspection module 46 performs a quality check of the trimmed shield using a vision inspection system.

Figure 6:
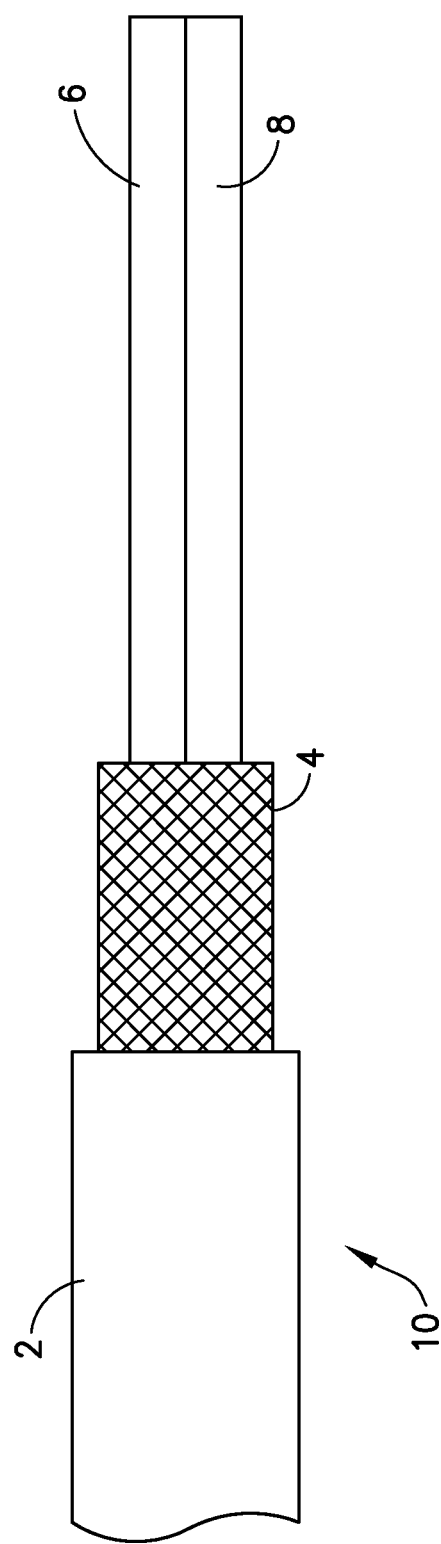
FIG. 6 is a diagram representing a side view of a portion of a cable having an unjacketed end with an exposed shield that has been trimmed.

FIG. 6 is a diagram representing a side view of a portion of a cable 10 having an unjacketed end with an exposed shield 4 that has been trimmed. The trimming of the shield 4 in turn exposes the wires 6 and 8 of the cable 10. The shield trim is inspected using a vision system that includes a camera system arranged to capture a 360-degree view of the trimmed shield and a computer programmed to analyze the captured images. More specifically, the computer is configured to determine whether excessive gaps are present in the exposed shield (e.g., caused by broken shield strands) or not. The evaluation system compares perceived gaps in the image with a maximum allowable gap value to ensure that the percentage of shield coverage is within the specified tolerance. Shield coverage percentages below a specified minimum percentage of coverage indicate to the evaluation system that an unacceptable number of shield strands may be broken. The computer may also be configured to determine whether the length of the exposed shield on the cable is within an allowable range.

After the shield trim inspection module 46 has inspected the trimmed shield 4 of the cable 10, the pallet 64 moves to one of two solder sleeve installation modules 52 and 54 (see FIG. 1). The solder sleeve installation modules 52 and 54 are configured to install a solder sleeve 12 with a ground wire 14 onto the cable 10 using automated picking, placing and melting operations.

FIG. 7A is a diagram representing a side view of a typical solder sleeve 12 having a pre-installed ground wire 14. The solder sleeve 12 includes a sleeve 7 made of transparent, heat-shrinkable thermoplastic material. The internal diameter of the sleeve is greater than the outer diameter of the cable being processed. The solder sleeve 12 further includes a central solder ring 9 adhered to the inside of the sleeve 7 at a central position and a pair of thermoplastic sealing rings 13a and 13b.

FIG. 7B is a diagram representing a side view of the solder sleeve 12 depicted in FIG. 7A when placed in a position overlying a portion of a cable 10 having a jacket 2 and an unjacketed portion where the shield 4 is exposed. The exposed shield 4 is surrounded by the central solder ring 9, which when melted and then solidified will form an electrical connection between the shield 4 and the ground wire conductor strand 15. The sleeve 7 has not yet been melted.

FIG. 7C is a diagram representing a side view of the solder sleeve 12 depicted in FIG. 7A after the solder sleeve 12 has been melted on the cable 10.

As disclosed above, the solder sleeve installation module 52 and 54 (see FIG. 1) are each configured to install a solder sleeve 12 onto the end of a cable 10. The cable processing equipment of a solder sleeve installation module may be used to install a solder sleeve 12 (e.g., of the type described with reference to FIG. 7A) or a dead end sleeve made of electrical insulation material only. Solder sleeves are melted and shrunk onto an end of a cable; a dead end sleeve is shrunk without melting onto an end of a cable. Solder sleeves and dead end sleeves are separated by part number and distributed onto different vibration tables. (Vibration tables could be replaced with tape-and-reels or cartridges). If the solder sleeve is on a tape-and-reel or cartridge, the solder sleeve will be pushed out of the cavity (via pneumatic actuator, electric actuator, etc.) so that an end effector can grip it.

FIGS. 8A and 8B are diagrams representing a side view of a portion of a sleeve-cable assembly 1a having an "out front" solder sleeve 12. The sleeve-cable assembly 1a includes a solder sleeve 12 having a ground wire 14 that extends away from the jacket 2 of cable 10. The solder sleeve 12 is threaded onto the wires 6 and 8 until the solder sleeve 12 is in a position surrounding the exposed shield 4. As seen in FIG. 8A, the "out front" solder sleeve 12 also surrounds an end segment of the jacket 2 and unshielded portions of wires 6 and 8. FIG. 8A shows sleeve-cable assembly 1a before the "out front" solder sleeve 12 is melted on the cable 10. FIG. 8B shows sleeve-cable assembly 1a after the "out front" solder sleeve 12 has been melted on the cable 10.

FIGS. 9A and 9B are diagrams representing a side view of a portion of a sleeve-cable assembly 1a having an "out back" solder sleeve 12. The sleeve-cable assembly 1a includes a solder sleeve 12 having a ground wire 14 that extends toward the jacket 2 of cable 10. The solder sleeve 12 is threaded onto the wires 6 and 8 until the solder sleeve 12 is in a position surrounding the exposed shield 4. FIG. 9A shows sleeve-cable assembly 1a before the "out back" solder sleeve 12 is melted on the cable 10. FIG. 9B shows sleeve-cable assembly 1a after the "out back" solder sleeve 12 has been melted on the cable 10.

At the start of a solder sleeve installation procedure, a robotic end effector is controlled to move to whichever one of a plurality of vibration tables (or other solder sleeve storage devices) has the correct type of solder sleeve 12 to be installed on the cable 10. The robotic end effector picks up a solder sleeve and carries it to the apparatus depicted in FIGS. 11-14. The robotic end effector has a pair of gripper fingers designed to grip a particular type of solder sleeve. The robotic end effector may be integrated onto a robotic arm or gantry with a vision system that recognizes the solder sleeve, thereby enabling the robot arm to be properly aligned when attempting to pick up the sleeve with a predetermined pigtail orientation. Pick and place vision systems are commercially available off the shelf and could be adapted to grip a particular solder sleeve 12.

Figure 10A:
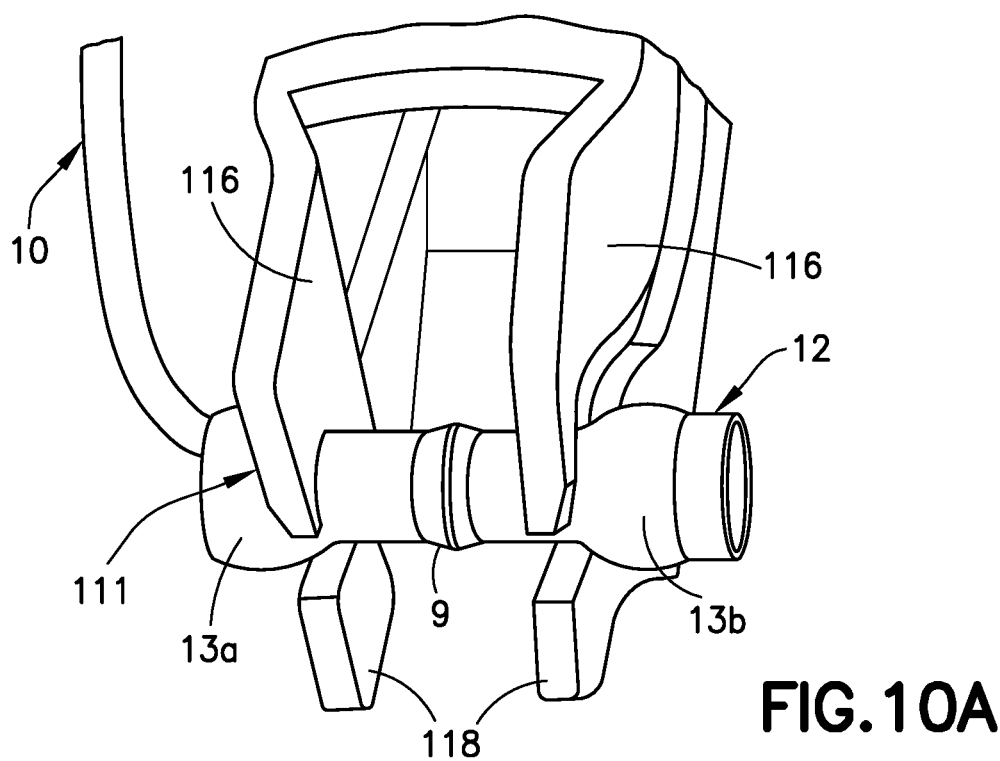
FIG. 10A is a diagram showing a view of a portion of an end effector in accordance with one embodiment having two pairs of prongs gripping a solder sleeve.
Figure 10B:
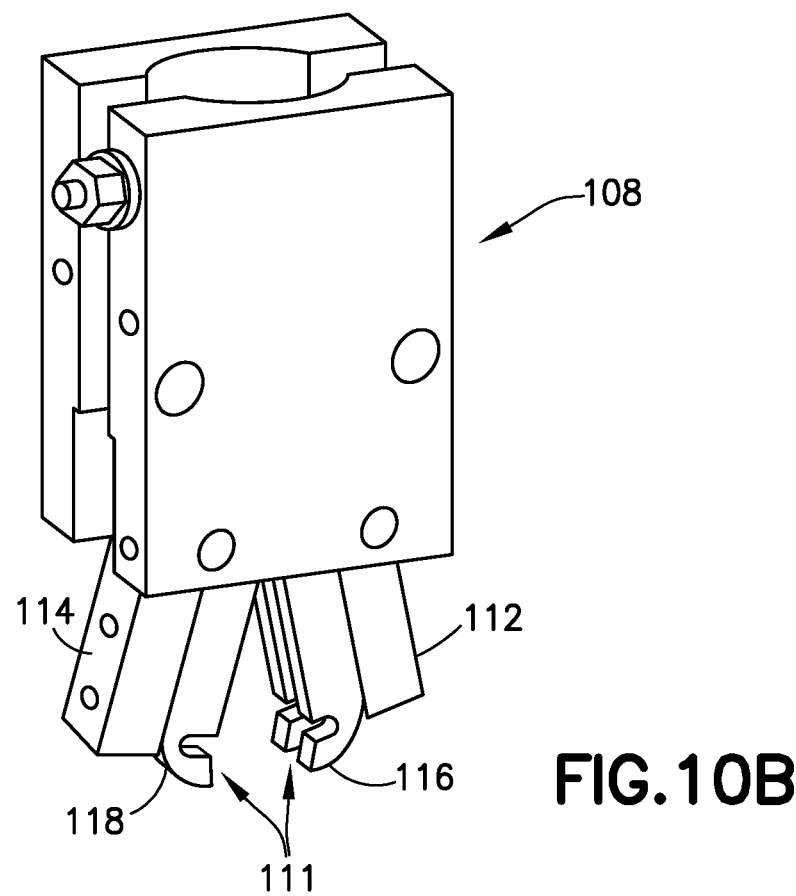
FIG. 10B is a diagram showing a view of an end effector having a pair of sleeve gripper fingers and respective pairs of prongs attached to the gripper fingers.

FIG. 10B is a diagram showing a view of an end effector 108 having a pair of gripper fingers 112 and 114 and respective pairs 116 and 118 of prongs (or claws) attached to the gripper fingers 112 and 114 respectively for forming a sleeve gripper 111. FIG. 10A is a diagram showing a view of the two pairs 116 and 118 of prongs of the sleeve gripper 111 gripping a solder sleeve 12. The insulation rings 13a and 13b on each end of the solder sleeve 12 have a larger outer diameter than the rest of the solder sleeve 12. When the prongs 116 and 118 close over the portions of the solder sleeve 12 between the insulation rings 13a, 13b and the central solder ring 9, it is impossible for the insulation rings 13a and 13b to slip/pass through the opening between opposing prongs, thus making it impossible for the solder sleeve 12 to be able to inadvertently slip out of the sleeve gripper 111.

In one embodiment, the prongs 116 and 118 of the gripper fingers 112 and 114 are designed to cover or shield as little surface area of the solder sleeve 12 as possible. By maximizing the exposed surface area, it would be possible to apply heat to the solder sleeve 12 and perform the melt process while still gripping the solder sleeve 12 with the sleeve gripper 111. This would ensure that the solder sleeve 12 does not inadvertently become misaligned or move out of place prior to the heat application. This would also require that the prongs 116 and 118 be fabricated from a heat-resistant or metal material.

The robotic end effector 108 may be designed to pick and place solder sleeves or dead end sleeves. The end effector 108 is intended to be used as a part of a solder sleeve pick, place and melt module 52 or 54 that has been integrated into a fully automated system.

The prongs 116 and 118 of the gripper fingers 112 and 114 make contact with and grip the solder sleeve 12. The gripper fingers 112 and 114 may be attached to a pick-and-place air cylinder or some other device capable of moving gripper fingers 112 and 114 together and apart. The prongs 116 and 118 are designed to be able to hold solder sleeves of different sizes. In some in cases, solder sleeve parts may be constructed using large tolerance values; thus in actuality may vary in diameter, length, etc. The sleeve gripper 111 is designed to contact and grip the solder sleeve 12 between the central solder ring 9 and the insulating rings 13a, 13b, regardless of solder sleeve size thus avoiding the solder sleeve 12 from slipping out. The solder sleeve may have an indent in that space and can be held from it as shown in FIG.

10A. The opposing pairs of prongs 116 and 118 have semi-circular cutouts which prevent the solder sleeve 12 from being crushed and center the solder sleeve 12 within the sleeve gripper 111 for accurate placement during the installation process. The prongs 116 and 118 should be made of a rigid, heat-resistant material. Examples include aluminum, steel, etc.

In accordance with various proposed embodiments, the solder sleeves 12 will be separated by part number and located on reels of tape, in cartridges, or on vibration tables. The end effector 108 will be able to pick up a solder sleeve 12 from any of these configurations. Vibration tables are flat surfaces that vibrate to shift products from the end of the table (where they are loaded) to the front. In the case of solder sleeves carried by a carrier tape wound on a reel, the solder sleeves would be extracted from the cavity prior to gripping with the gripper fingers (using an underside actuator, gravity, etc.). In the case of a cartridge loaded with solder sleeves, a solder sleeve would need to be extracted from a cavity prior to gripping with the gripper fingers.

The end effector may be adapted for coupling to a robotic arm or a gantry robot. A gantry robot consists of a manipulator mounted onto an overhead system that allows movement across a horizontal plane. Gantry robots are also called Cartesian or linear robots. The robotic arm may be part of a robot having multi-axis movement capabilities. The robot includes one or more positional sensors (not shown) at, or otherwise associated with, each of the pivots that provide positional data (X, Y, and Z in three-dimensional space) to the data acquisition system for accurately locating the solder sleeves. An example of a robot that could be employed with the end effector 108 shown in FIG. 10A is robot Model KR-150 manufactured by Kuka Roboter GmbH (Augsburg, Germany), although any robot or other manipulator capable of control the position of the end effector 108 in the manner disclosed herein. The term "gantry/robot arm" will be used herein to mean a robot of either type having a robot controller configured to move and control the end effector 108 to perform the solder sleeve pick and place operations disclosed herein.

The sleeve gripper 111 will be used as a part of an end effector within the solder sleeve pick, place and melt module. The end effector 108 picks up a solder sleeve 12, places it over the prongs of a funnel 170 to partially encase them, and waits for the cable 10 to be passed through the funnel 170 and the solder sleeve 12. Once the cable 10 is through, the end effector 108 moves back to position the solder sleeve 12 over the desired area of cable 10. In accordance with embodiment, the desired area includes the exposed portion of the trimmed shield 4, an adjacent portion of the jacket and adjacent portions of the wires 6 and 8. The end effector 108 then releases the solder sleeve 12 and moves out of the way of the heating elements, which close over the solder sleeve 12 and melt the sleeve in place on the cable 10. In another embodiment, the end effector 108 does not release the solder sleeve and instead remains in place to hold the sleeve and cable stationary during the heating process. The heating elements are moved in position and then activated to heat the solder sleeve 12 while the prongs 116 and 118 hold the solder sleeve.

This end effector 108 enables the solder sleeve installation process to be fully automated. By automating this process, risks associated with the current manual process (repeatable quality, ergonomic issues, slower cycle times) are eliminated.

The cable processing equipment at each solder sleeve installation module 52 and 54 further comprises a set of funnels 170 (see FIG. 1) designed to accommodate shielded cables before and after a solder sleeve has been installed onto the cable. These funnels not only serve to guide the cable movement, but also to protect the exposed shielding of the cable as the cable 10 is fed through the solder sleeve 12 and positioned such that the exposed shield 4 is surrounded by the solder sleeve 12.

Once a solder sleeve 12 is installed onto a cable 10 on the intended area, the overall diameter of the combination of the cable 10 and solder sleeve 12 (sleeve-cable assembly 1 as shown later in FIG. 16A) is thus larger in diameter at that area than cable 10 originally. To the extent that the narrowest point along the open-top funnel 170 has been sized to match the outer diameter of the cable 10, a cable 10 with an installed solder sleeve 12 is unable to pass through the open-top funnel 170 for the purpose of exiting the solder sleeve installation module 52 or 54. To remove this obstacle, an "open top" funnel 170 has been designed in which a slot (hereinafter "opening 76") was created in the top portion of each funnel 170. Such a slot 76 enables funnel 170 to accommodate changes and variations to the cable exterior size as it undergoes modifications through sleeve installation.

Figure 11:
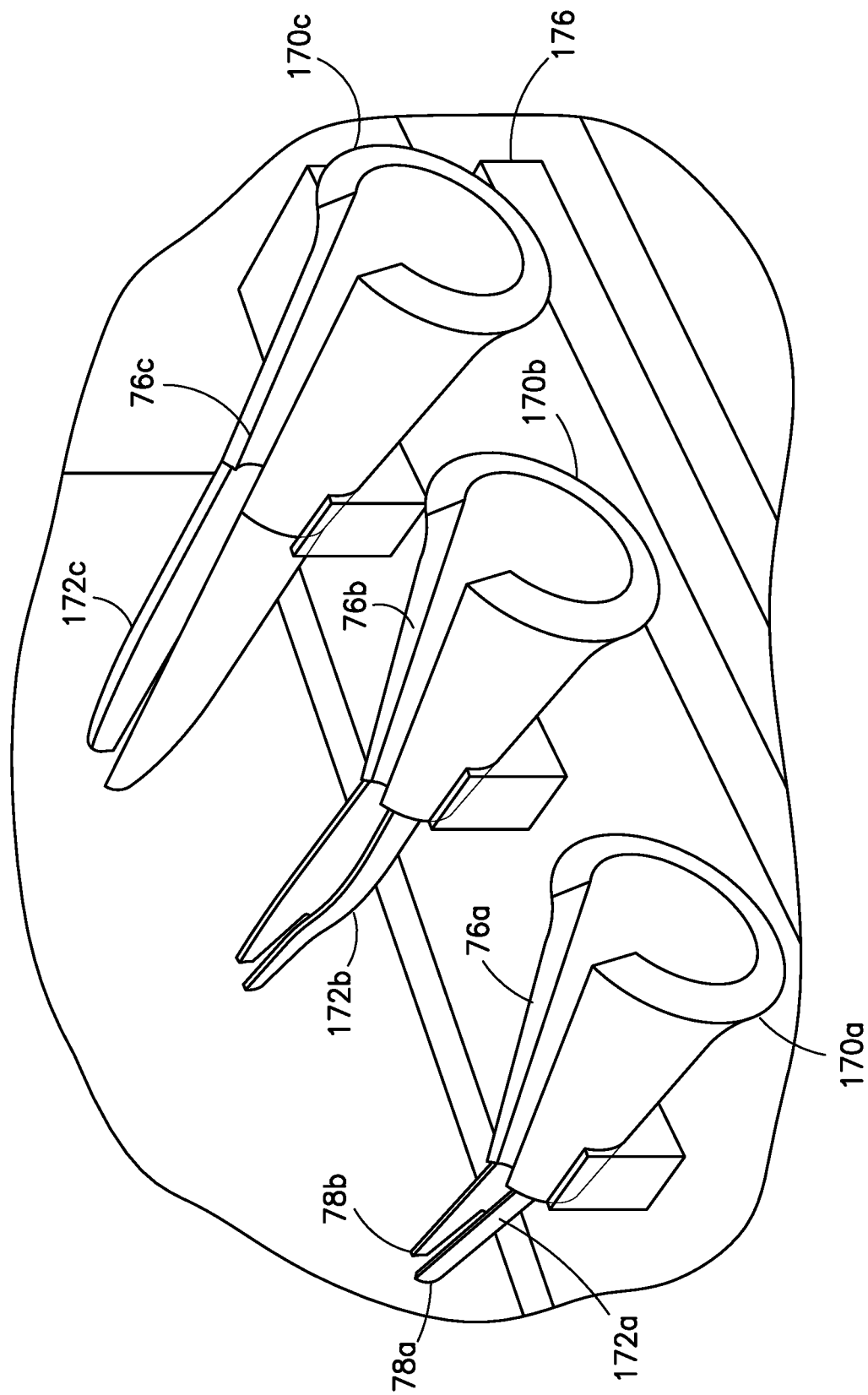
FIG. 11 is a diagram showing a view of some components of a cable processing module including a set of three open-top funnels designed to thread cables with exposed shields through solder sleeves of different sizes.
Figure 12:
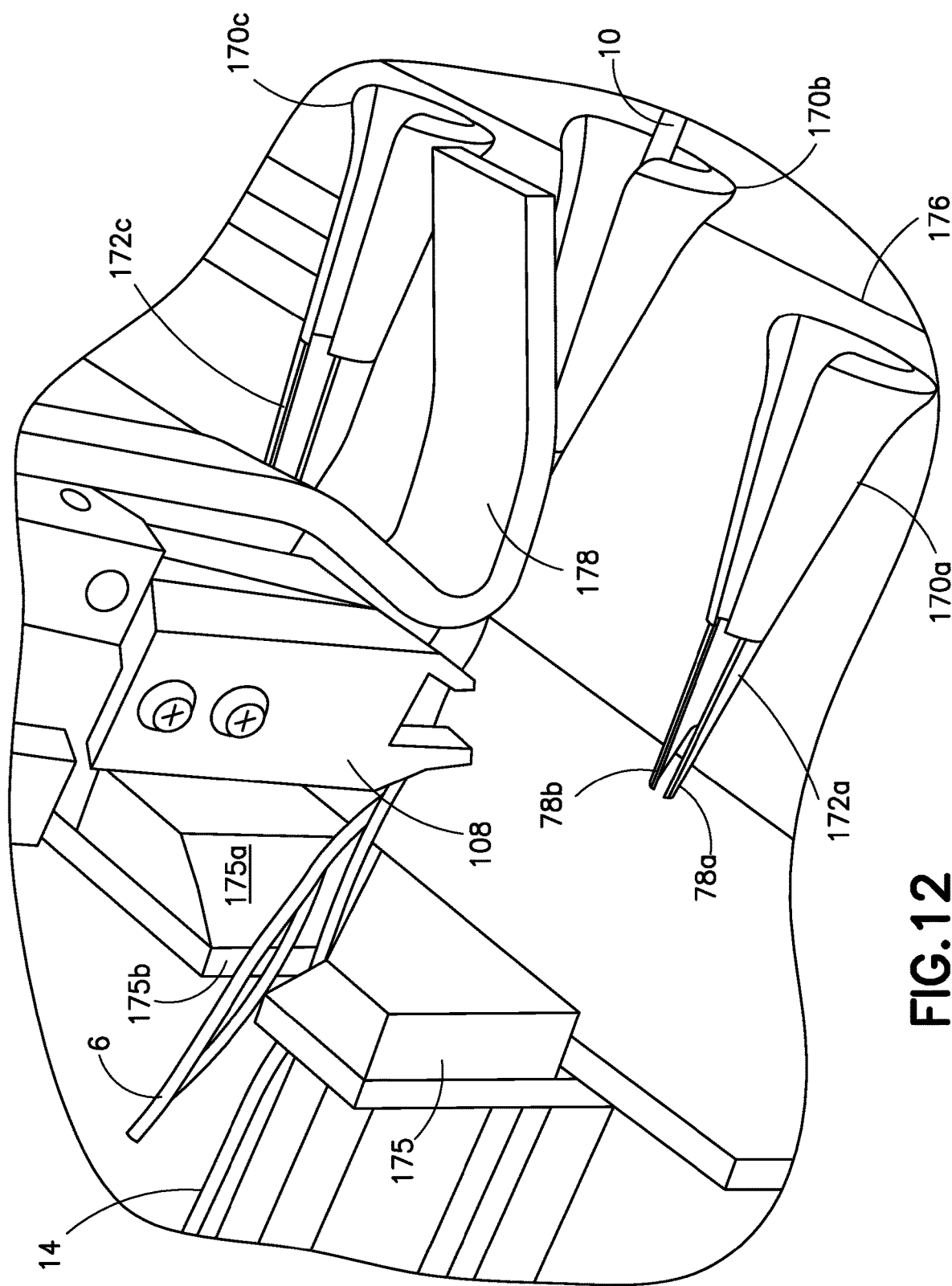
FIG. 12 is a diagram showing a view of the components depicted in FIG. 11, with the addition of an end effector having fingers that grip the sleeve of the sleeve-cable assembly and a cover plate that covers the open top of the central funnel.

FIG. 11 is a diagram showing a view of some components of a solder sleeve installation module including a set of three open-top funnels 170a-170c designed to thread cables with exposed shields through solder sleeves of different sizes. The openings 76a-76c formed in the top portions of the open-top funnels 170a-170c enable removal of the cable 10 from the funnel after a solder sleeve 12 has been installed. The open-top funnels 170a-170c are mounted on a sliding plate 176 that is capable of sliding side to side to place a correct open-top funnel. As depicted in FIG. 12, an open-top funnel 170b is placed in front of a notch 175b of a cable guide block 175. The cable guide block further includes a guide surface 175a for guiding the end of the cable 10 into the notch 175b during cable insertion.

The funnel system further includes multiple funnel extensions 172a-172c. The plastic open-top funnels 170a-170c are effectively extended by attaching respective funnel extensions 172a-172c. Alternatively, the funnel extensions 172a-172c may be integrally formed with the respective open-top funnels 170a-170c. Each of the funnel extensions 172a-172c may terminate in a pair of prongs 78a and 78b. The prongs 78a and 78b are sized and configured to fit within the inner diameter of the applicable solder sleeve. More specifically, the prongs 78a and 78b are tapered along their lengths so that they easily enter the solder sleeve 12 as the solder sleeve is moved into position. Preferably the prongs 78a and 78b are made of a material having a low coefficient of friction (e.g., metal) so that the cable 10 may easily slide along the interior surface of the prong. Also the prongs 78a and 78b are thin enough that the prongs do not adversely impact the cable's ability to fit through the solder sleeve 12. The prongs 78a and 78b preferably have smooth interior surfaces devoid of rough patches or sharp edges that might damage the shield 4 and/or cable 10. The prongs 78a and 78b close off a large portion of the internal surface of the solder sleeve 12, and provide a smooth surface for the cable 10 to slide along as it is fed through the open-top funnel 170 and the solder sleeve 12. The prongs 78a and 78b eliminate the need to create, and then later remove, a sacrificial jacket slug.

When the trimmed shield cable 10 is inserted through the solder sleeve 12, snagging or otherwise catching of the shield strands or wire ends against the inner surface of the solder sleeve (which could damage the cable) is prevented by the intervening prongs 78a and 78b. The size and length of the funnel extensions are designed/determined based on the size of the solder sleeve 12 to be installed. The prongs 78a and 78b should be long enough to extend through at least a portion if not most of the solder sleeve 12, and should taper down along the length of the prongs 78a and 78b to facilitate easy placement of the solder sleeve 12 over the prongs 78a and 78b.

FIG. 12 is a diagram showing a view of the components depicted in FIG. 11, with the addition of an end effector 108 for placing a solder sleeve 12 (not visible in FIG. 12, but see FIG. 13) onto a portion of a cable 10 having an exposed shield 4 as part of an automated solder sleeve installation operation. FIG. 12 depicts one state during the solder sleeve installation process wherein the solder sleeve 12 has already been placed around the funnel extension 172b by the end effector 108 and the cable 10 has already been fed through the open-top funnel 170b and solder sleeve 12.

More specifically, the solder sleeve installation process in accordance with one embodiment includes the following steps which are performed before the state of the apparatus depicted in FIG. 12 is attained. The end effector 108 picks up a solder sleeve 12 from a vibration table (or other sleeve supply mechanism), places it over the end of the funnel extension 172b, and then in one embodiment remains stationary while the cable 10 is being fed through the solder sleeve 12 by the cable positioning mechanism 19. As seen in FIG. 12, the end effector 108 is equipped with a plastic cover plate 178 which closes off the open-top funnel 170b to prevent the cable 10 from escaping the open-top funnel 170b as it is fed through the solder sleeve 12. Next, in one embodiment, the end effector 108 remains holding the sleeve 12 with the wire inserted through it, and awaits the soldering operation to be performed on the sleeve. In another embodiment, the end effector 108 releases the solder sleeve 12 and moves out of the way prior to the solder sleeve melt process, which situation is shown in FIG. 13.

Figure 13:
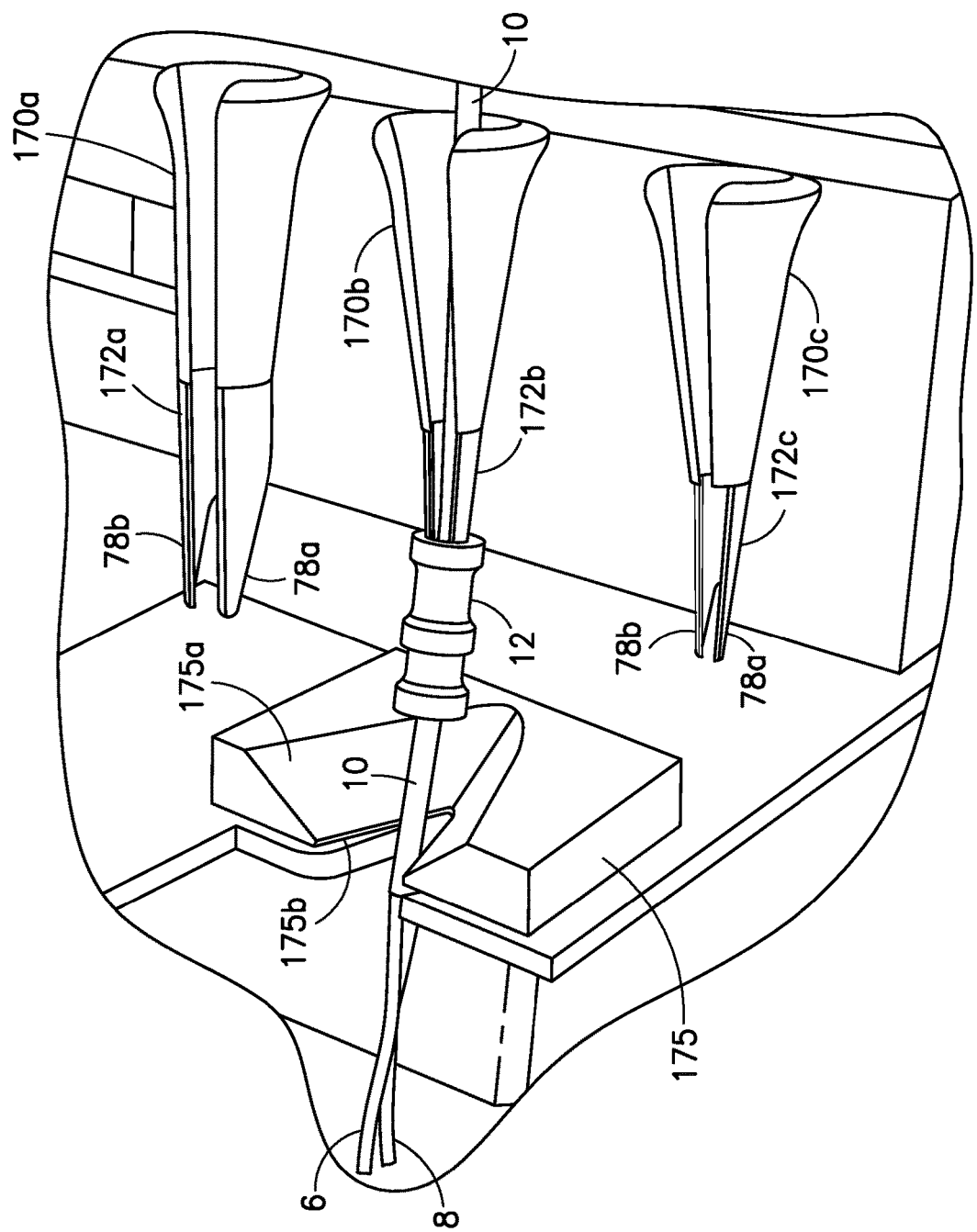
FIG. 13 is a diagram showing a view of the components depicted in FIG. 11 at an instant in time after a solder sleeve has been placed on a funnel extension and a cable has been passed through the open-top funnel and the solder sleeve as part of an automated solder sleeve installation operation.

FIG. 13 is a diagram showing a view of the components depicted in FIG. 11 at an instant in time after a solder sleeve 12 has been placed on a funnel extension 172b and after a cable 10 has been passed through the open-top funnel 170b and the solder sleeve 12 as part of an automated solder sleeve installation operation. As seen in FIG. 13, the solder sleeve 12 is seated on the funnel extension 172b. The funnel extension 172b closes off a large portion of the internal surface of the solder sleeve 12, and provides a smooth surface for the cable 10 to slide along as it is fed through the open-top funnel 170b and the solder sleeve 12.

Figure 14:
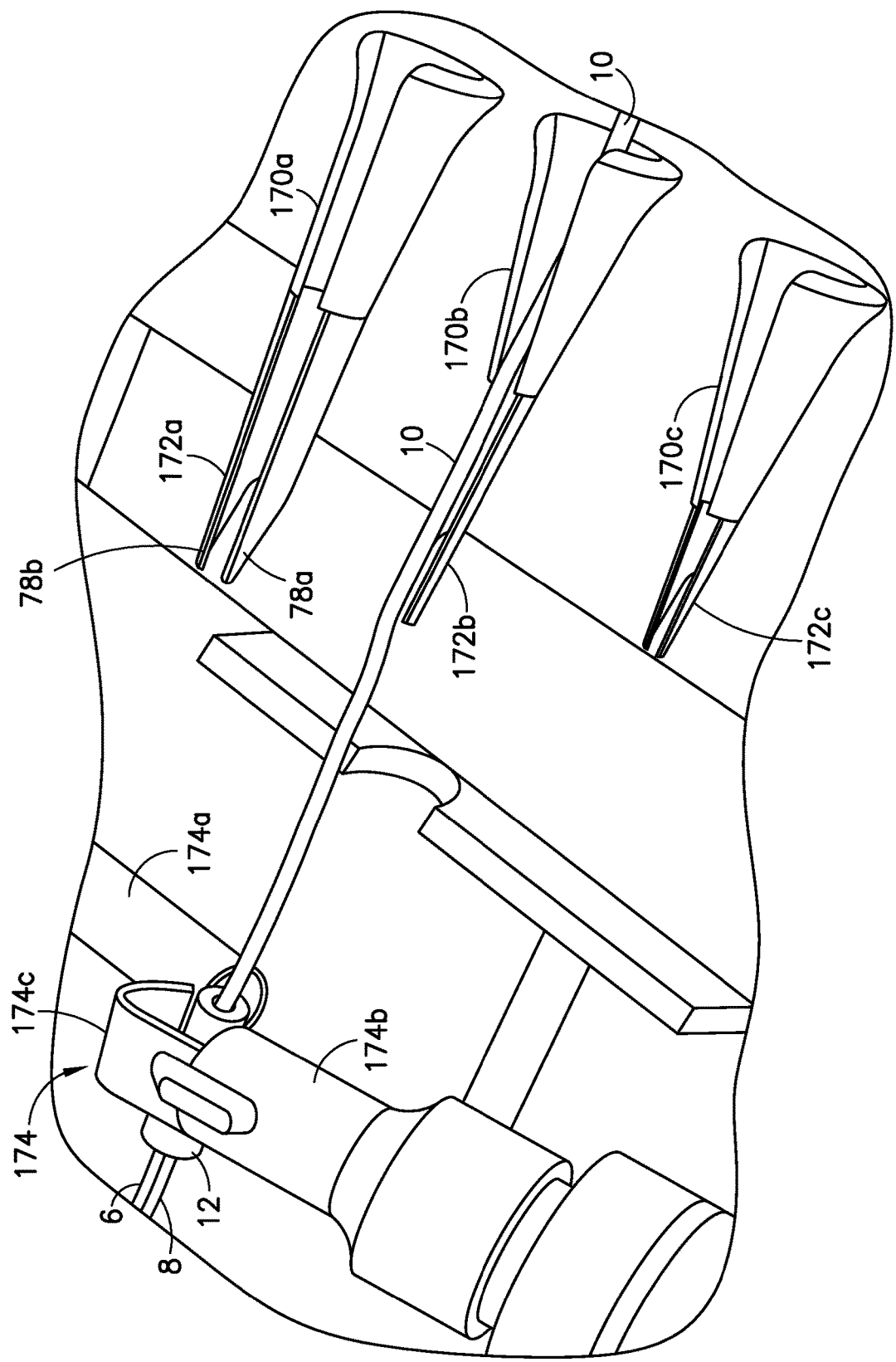
FIG. 14 is a diagram representing a view of an apparatus for melting a solder sleeve onto a portion of a cable having exposed shielding using hot air as part of an automated solder sleeve installation operation.

The system controller (not shown in FIG. 13, but see system controller 100 in FIG. 20) may either calculates how far the cable positioning mechanism 19 (see FIG. 4B) should drive the cable 10 into the module based on cable strip length information or uses a known pre-set value. The cable shield 4 is stopped at a repeatable position for processing. Thereafter the end effector 108 (see FIG. 10B) moves the solder sleeve 12 to the repeatable position seen in FIG. 14 for processing. These repeatable positions are such that the solder sleeve 12 is centered over the exposed area of the trimmed shield 4 of the cable 10. In one embodiment, the end effector 108 then releases the solder sleeve 12 and moves out of the way (back to the origin position) prior to the start of the solder sleeve melt process. In another embodiment, the end effector 108 remains holding the sleeve 12 during the heating process. FIG. 14 shows one embodiment of an apparatus for melting a solder sleeve 12 onto a portion of a cable 10 having exposed shielding using hot air as part of an automated solder sleeve installation operation.

The system controller 100 sends commands to a robotic apparatus that places the components of the heating tool 174 in the positions seen in FIG. 14. In this example, the heating tool 174 includes two hot air guns 174a and 174b placed on opposite sides of the solder sleeve 12 and a curved-tip nozzle 174c attached to the outlet of the hot air gun 174a. The curved-tip nozzle 174c projects from the hot air gun 174a and overhangs the solder sleeve 12. In addition, the hot air gun 174b may have a flat-tip nozzle attached that is roughly the length of the solder sleeve. The hot air gun 174b moves laterally from the right of the solder sleeve 12 into position. The hot air gun 174a rotates down over the solder sleeve 12. The hot air guns 174a and 174b may be moved into heating position by activation of respective linear actuators (not shown). Other embodiments may use a single hot air gun, or more than two.

During the heating stage, the two hot air guns 174a and 174b apply heat to the solder sleeve 12. The curved-tip nozzle 174c "reflects" the generated hot air and causes it to flow around the solder sleeve 12. The heating tool 174 generates sufficient heat in the heating zone that the solder ring 9 of the solder sleeve 12 melts onto the cable 10. Using two hot air guns improves the even application of heat to all sides of the solder sleeve 12, as well as enables an increase in the speed of the overall melting process. At no point should the hot air guns make physical contact with the solder sleeve 12 or cable 10 due to the possibility of charring or damaging the jacket 2 of the cable 10.

In accordance with alternative embodiments, other types of heating devices, such as infrared heaters, may be employed in the solder sleeve melting process. An infrared heater or heat lamp is a body with a higher temperature which transfers energy to a body with a lower temperature through electromagnetic radiation. Depending on the temperature of the emitting body, the wavelength of the peak of the infrared radiation ranges from 780 nm to 1 mm. No contact or medium between the two bodies is needed for the energy transfer.

Figure 15:
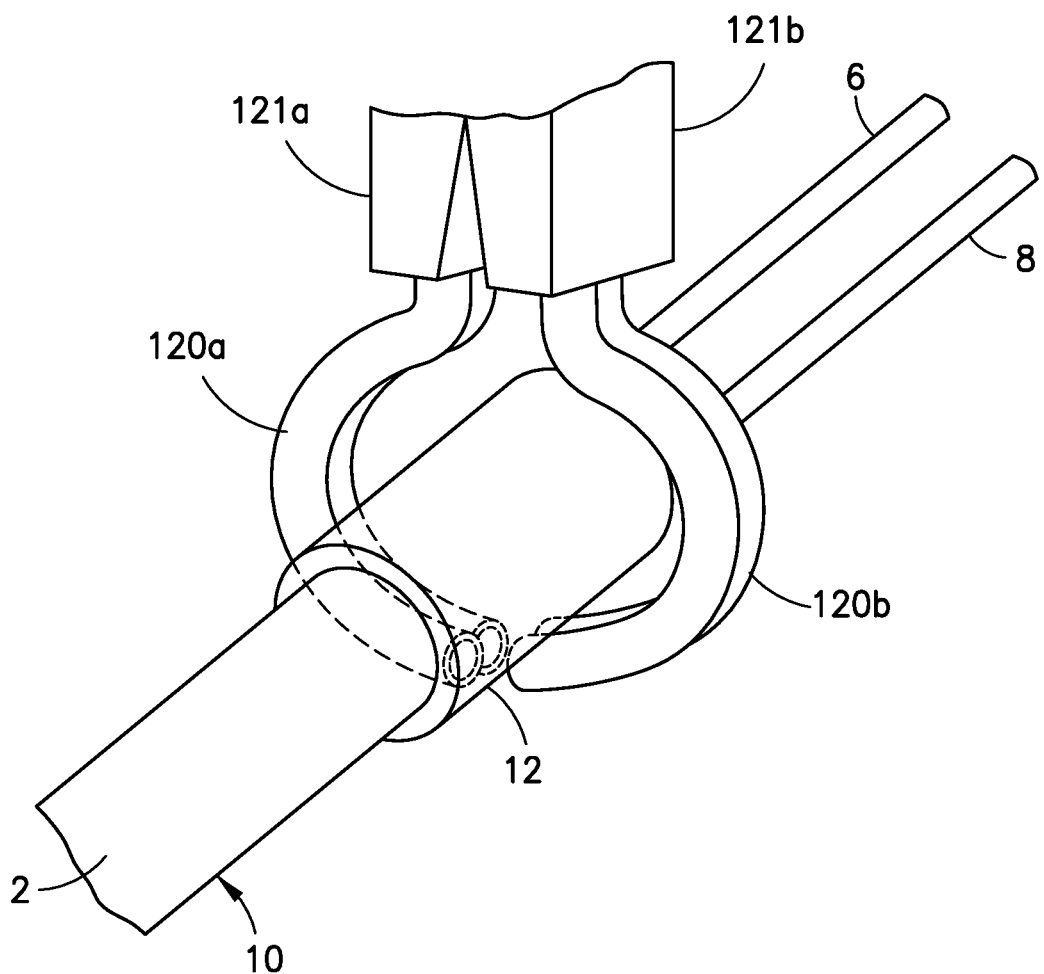
FIG. 15 is a diagram representing a view of an infrared heater in position to melt a solder sleeve onto a portion of a cable having exposed shielding as part of an automated solder sleeve installation operation.

FIG. 15 shows an infrared heating tool 94 in position to melt a solder sleeve 12 onto a portion of a cable 10 having exposed shielding as part of an automated solder sleeve installation operation. The infrared heating tool 94 includes a pair of quartz-encapsulated heating elements 120a and 120b which are plugged into respective heat sinks 121a and 121b. The quartz-encapsulated heating elements 120a and 120b, when closed, are configured to encircle a workpiece. Such heating elements are capable of providing instant radiant heat at temperatures up to 1500° F.

The heating process may be integrated with a method for performing an active monitoring method such as dimensional analysis to monitor solder sleeves during melting, or temperature monitoring to avoid over or spotty heating of the solder sleeve. In the case of dimensional analysis, laser measurement devices can be used and configured to record diameter data at specific points on the fused cable and solder sleeve in order to determine when the solder sleeve has been fully melted.

Once the solder sleeve 12 has been fully melted on the cable 10, the cable 10 may be popped up and out of the open-top funnel 170b (e.g., by a pneumatic lever that lifts the cable 10 upward or manually) and then retracted back toward the pallet 64 by the cable positioning mechanism 19 (e.g., drive wheel 16 and idler wheel 18 shown in FIG. 4B) or manually.

Figure 16A:
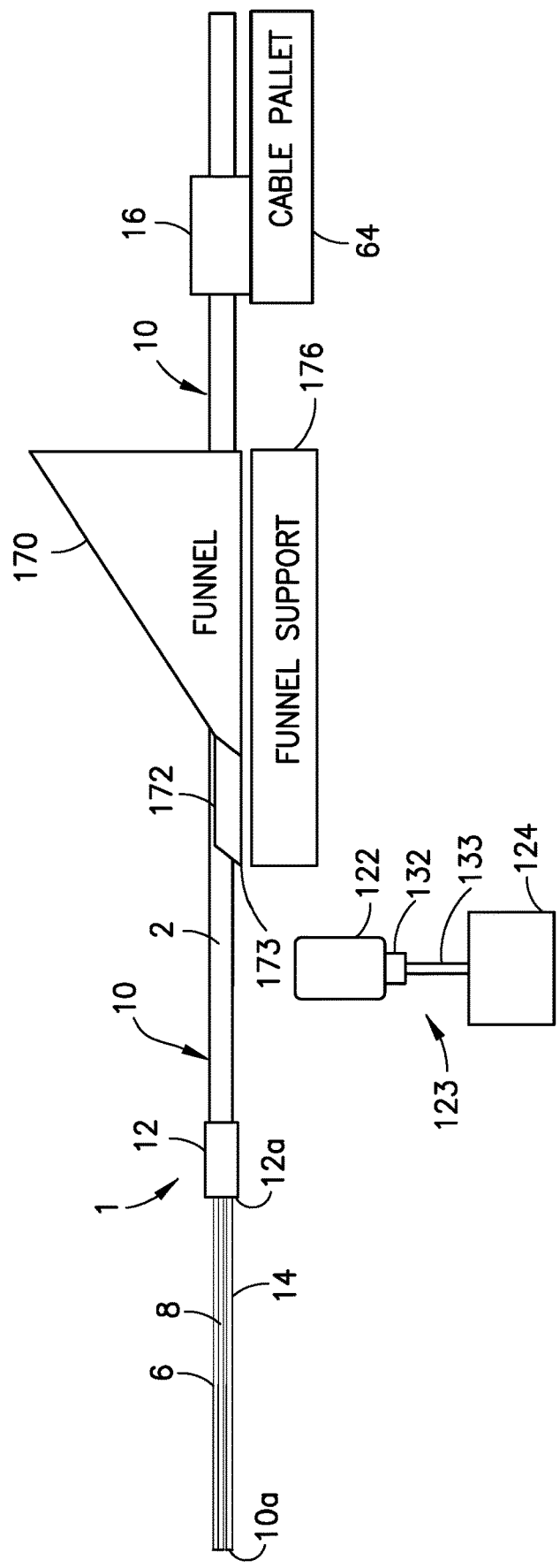
FIGS. 16A through 16D are diagrams showing a sleeve-cable assembly at respective instances in time after a solder sleeve has been melted on a cable: (a) before the sleeve-cable assembly is lifted upward (FIG. 16A); (b) during lifting of the sleeve-cable assembly (FIG. 16B); (c) during retraction of the sleeve-cable assembly after lifting (FIG. 16C); and (c) during further retraction of the sleeve-cable assembly (FIG. 16D).

FIGS. 16A through 16D are diagrams showing a sleeve-cable assembly 1 at respective instances in time after a solder sleeve 12 has been melted on a cable 10. FIG. 16A shows the sleeve-cable assembly 1 after melting and before being lifted upward to be removed from the funnel 170 and funnel extensions 172. In the situation depicted in FIG. 16A, the solder sleeve 12 is still located at the aforementioned repeatable position in a heating zone and the jacketed portion of the cable 10 (indicated by jacket 2) extends from the heating zone to the pallet 64. The jacketed portion of the cable 10 passes through the nip between the drive wheel 16 and the idler wheel 18 (not visible in FIG. 16A) and through the open-top funnel 170. In this vertical position, the sleeve-cable assembly 1 would be unable to pass through the open-top funnel 170, due to dimensional mismatch if the sleeve-cable assembly 1 were to be retracted due to the drive wheel 16 being rotated in a cable pulling direction (rightward in FIG. 16A).

In accordance with the embodiment depicted in FIG. 16A, the solder sleeve installation module further includes a cable lifting mechanism 123 that includes a lever arm 122 that is extended/retracted by a linear actuator 124. The linear actuator 124 may take the form of a pneumatic cylinder or a servo motor. In either case, the lever arm 122 includes a coupling 132 for attaching the lever arm to a distal end of a linearly vertically displaceable rod 133 of the linear actuator 124. The distance between the lever arm 122 and the tip 173 of the funnel extension 172 should not be more than the length from the tip 10b of the cable wires 6 and 8 to the forward edge 12a of the solder sleeve 12. In the state depicted in FIG. 16A, the lever arm 122 is retracted and not in contact with the cable 10. Other lifting mechanisms could also be used to lift the sleeve-cable assembly 1 out of the prongs and then remove it from the solder sleeve installation module 52 or 54.

Figure 16B:
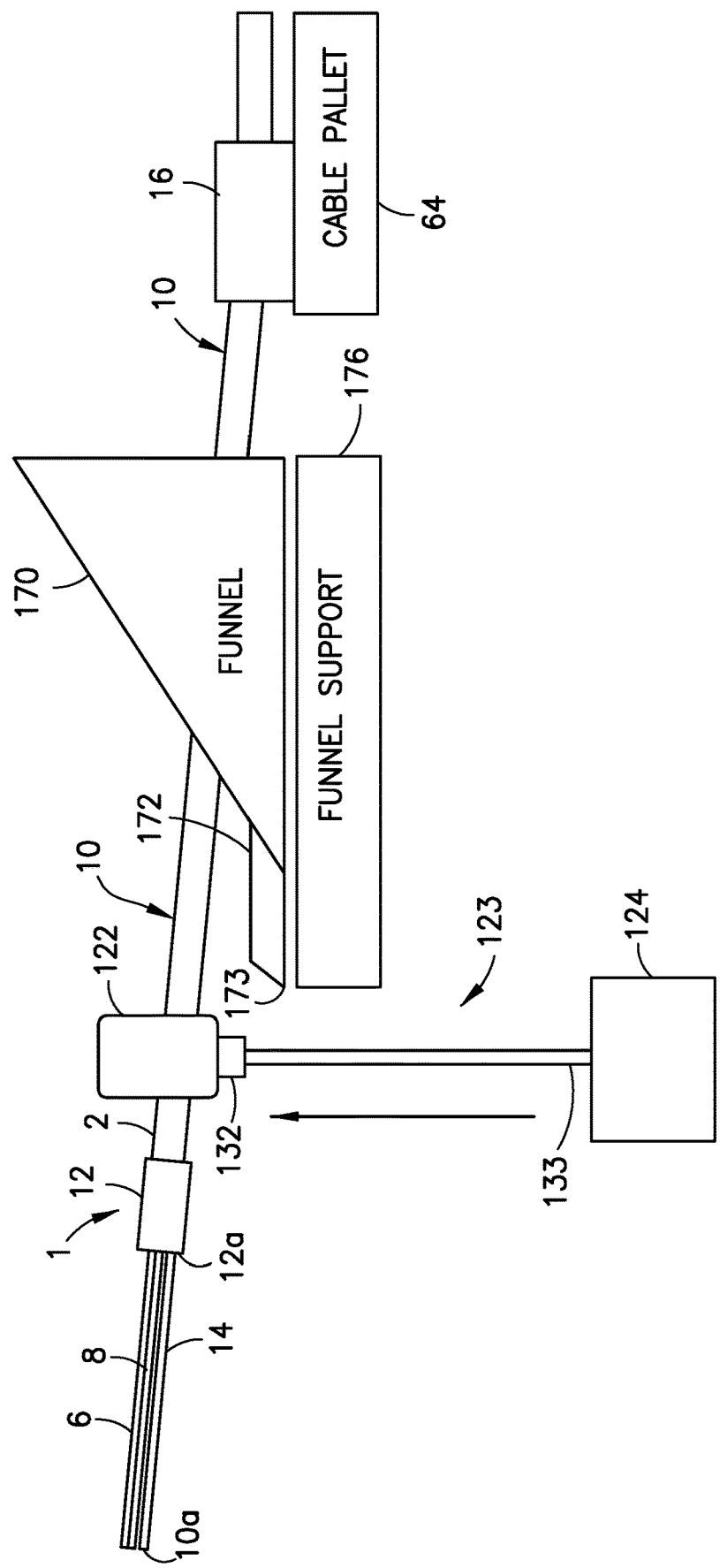

FIG. 16B shows the cable lifting mechanism 123 after the lever arm 122 has been raised first to a vertical position whereat the lever arm 122 comes into contact with a portion of cable 10 and then to a higher vertical position whereby the contacted portion of the cable is lifted. While the cable portion in front of the open-top funnel 170 is being lifted, the portion of the cable 10 that is in the nip between the drive wheel 16 and idler wheel 18 stays in the nip at the same elevation.

Figure 16C:
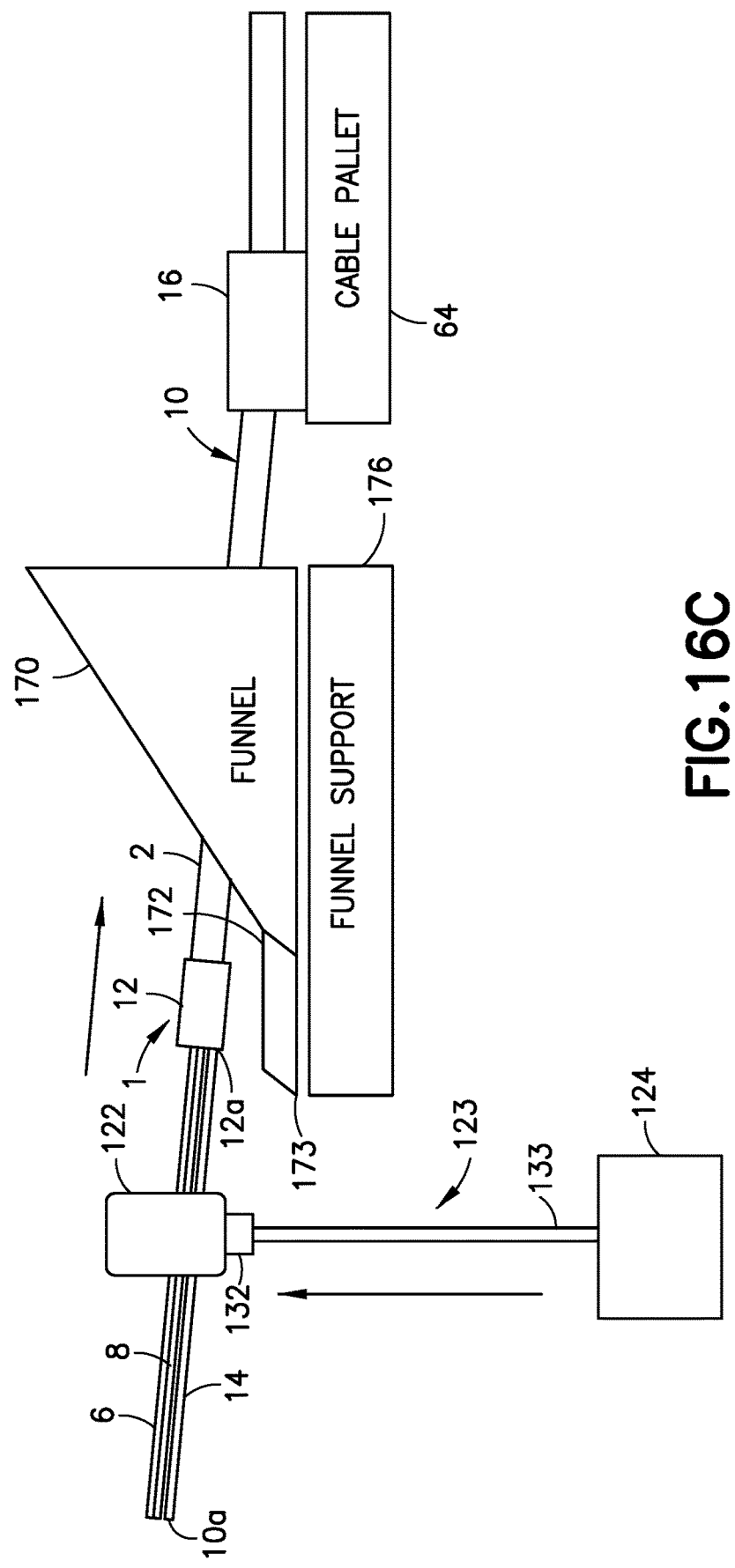
Figure 16D:
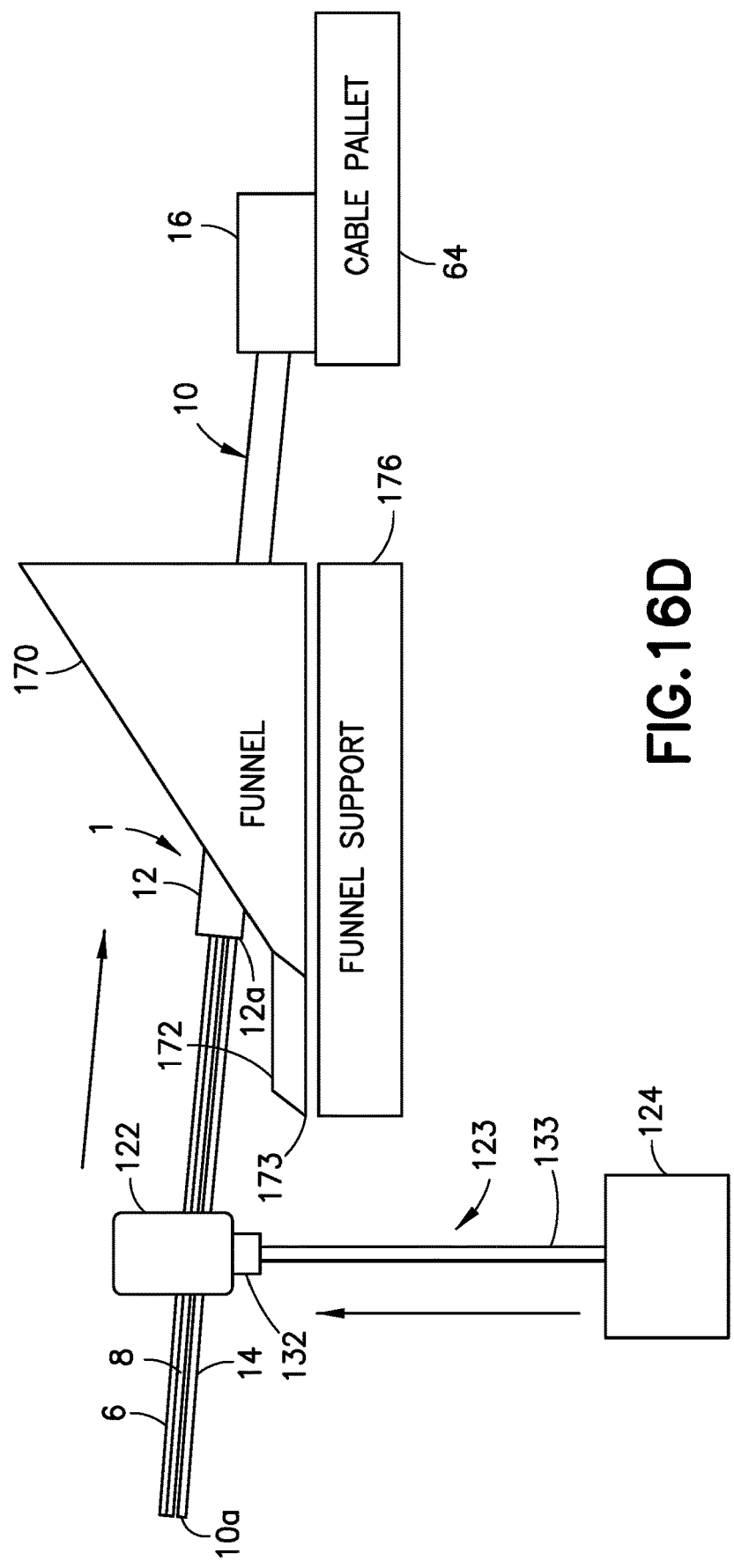

Referring now to FIG. 16C, the opening formed in the open-top funnel 170 (not visible in FIG. 16B or 16C) is configured so that when the lever arm 122 lifts the cable 10 as shown in FIG. 16B, the solder sleeve 12 is now able to be retracted by rotating the drive wheel 16 in the cable pulling direction, as indicated by the arrow in FIG. 16C parallel to the sleeve-cable assembly 1. FIG. 16D shows a later instant in time during passage of the solder sleeve 12 through the open-top funnel 170 as the cable 10 is retracted. The lever arm 122 and the tip of the funnel extension 172 are set up to ensure that the edge of the solder sleeve 12 that is closest to the prongs is able to clear the prongs without snagging when the cable 10 is lifted and removed.

Figure 17:
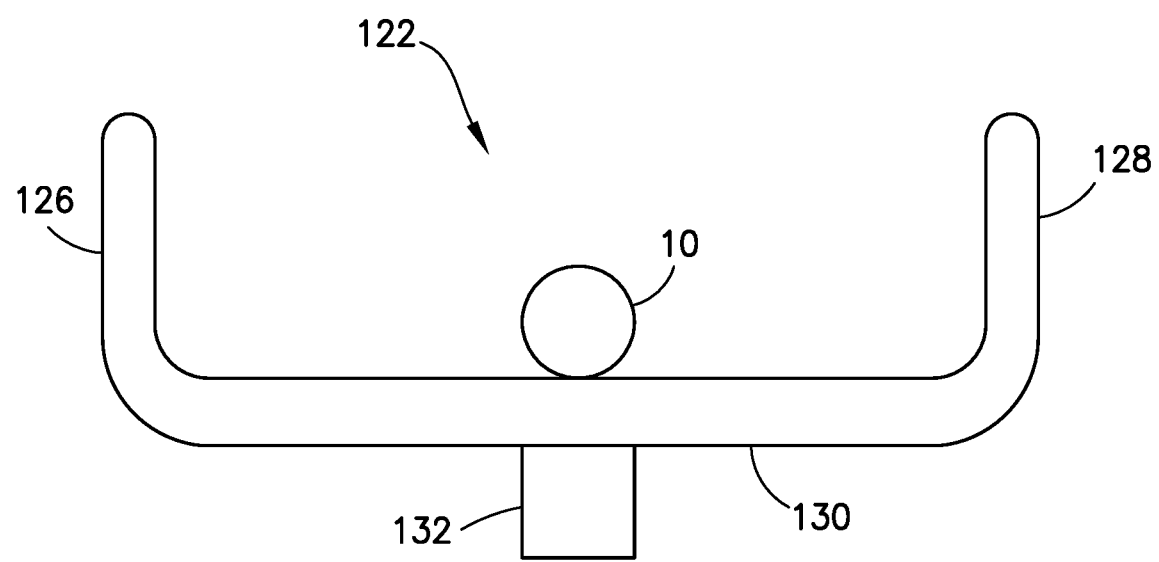
FIG. 17 is a diagram s representing a front view of a lever arm of a cable lift mechanism in accordance with one embodiment.

FIG. 17 is a diagram representing a front view of a lever arm 122 of a cable lift mechanism 123 in accordance with one embodiment. The lever arm 122 includes a horizontal base 130 and a pair of vertical walls 126 and 128 extending upward from the side edges of the base 130. The surfaces of the lever arm 122 should be smooth in order to permit the cable 10 to slide across the surface without excessive friction. There should be no sharp edges or rough surfaces that could potentially cause damage to the cable 10 or solder sleeve 12. The design shown in FIG. 17 includes raised sides in order to ensure that the cable 10 does not fall off of the cable lift mechanism 123 prematurely. The lever arm 122 may be made of plastic or metal. In other embodiments, the cable lifting mechanism 123 may be equipped with a magnetic device that would attract the metal parts in the cable and ensure the cable does not slip off of the cable lift mechanism 123.

Figure 18B:
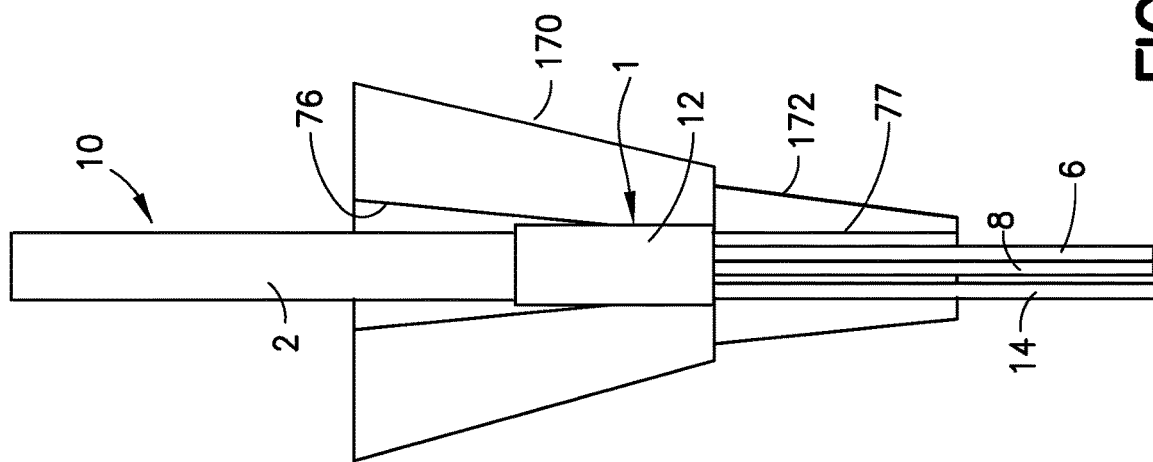
FIG. 18B is a diagram representing a top view of the open-top funnel depicted in FIG. 18A with a sleeve-cable assembly overlying and aligned with an open channel that extends through the funnel and funnel extension.
Figure 18A:
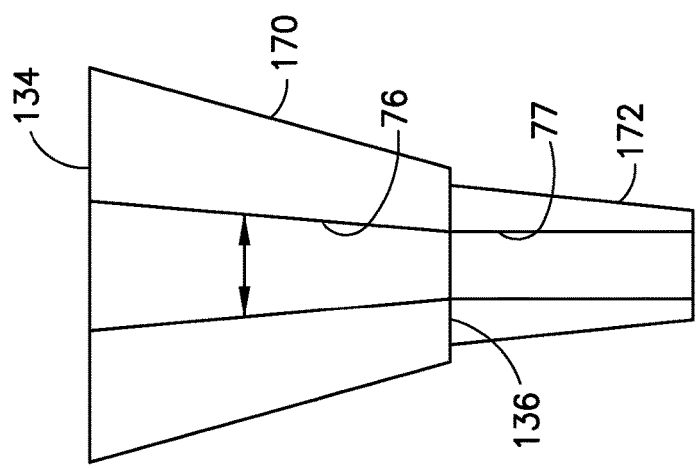
FIG. 18A is a diagram representing a top view of an open-top funnel having a funnel extension in accordance with one embodiment.

FIG. 18A is a diagram representing a top view of an open-top funnel 170 having a funnel extension 172 in accordance with one proposed implementation. The open-top funnel 170 has an opening 76 that extends from the entry side 134 of the funnel 170 to the exit side 136. The funnel extension 172 in turn has an opening 77 extending the length of the funnel extension 172.

FIG. 18B is a diagram representing a top view of the open-top funnel 170 depicted in FIG. 18A with a sleeve-cable assembly 1 overlying and aligned with openings 76 and 77. In this example, the jacket 2 has an outer diameter equal to or slightly less than the opening 77 in the funnel extension 172, whereas the solder sleeve 12 has an outer diameter greater than the opening 77. Thus the solder sleeve 12 cannot pass through the channel in funnel extension 172 and instead must be lifted and then passed over the opening 77.

As seen in FIG. 18B, although the outer diameter of the solder sleeve 12 is also greater than the width of opening 76 at the exit side 136 of the open-top funnel, again the uplifted solder sleeve 12 may again pass over that obstacle. As the opening 76 widens in the cable pulling direction however, as some point the opening 76 becomes wider than the outer diameter of the solder sleeve 12, which allows the solder sleeve 12 to pass through that portion of the open-top funnel 170, thereby facilitating retraction of sleeve-cable assembly 1.

Figure 19A:
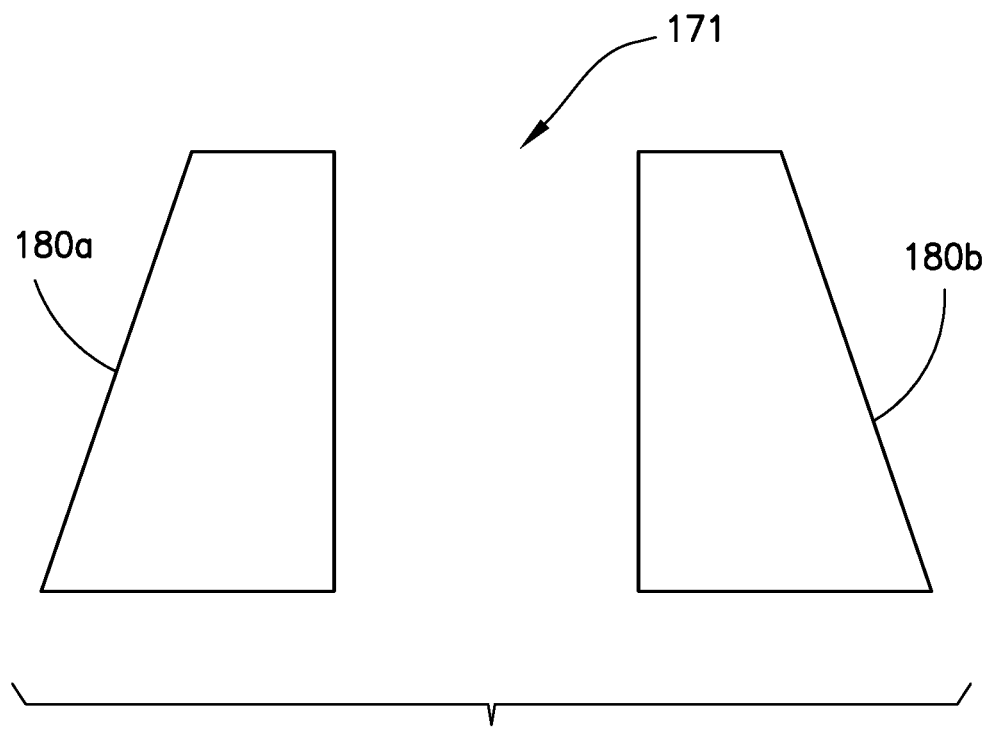
FIGS. 19A and 19B are diagrams representing a top view of a split funnel in open (FIG. 19A) and closed (FIG. 19B) states respectively.
Figure 19B:
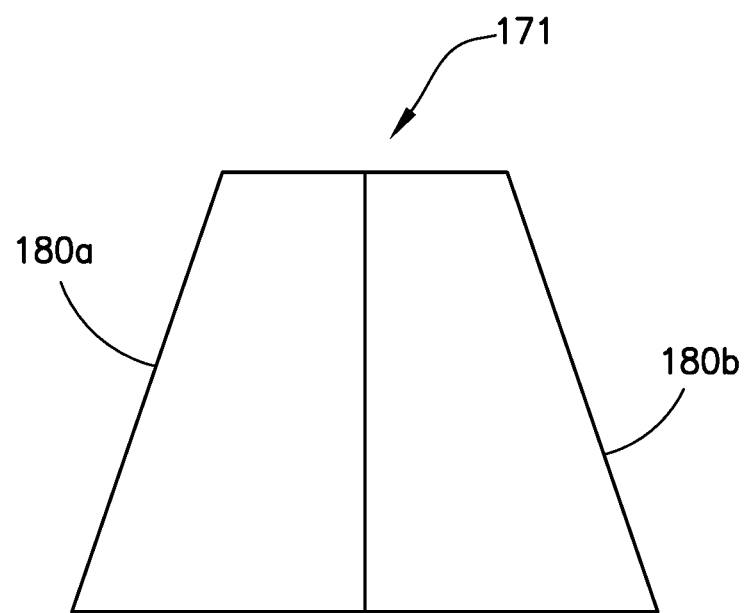

An alternative funnel system design may use a "split funnel". FIG. 19A is a top view of a split funnel 171 in an open state; FIG. 19B is a top view of split funnel 171 in a closed state. The split funnel 171 consists of two separable funnel halves 180a and 180b. The split funnel 171 has an open state in which the first and second funnel halves 180a and 180b are separated by a gap and a closed state in which the first and second funnel halves 180a and 180b are in contact with each other. The funnel halves 180a and 180b may be closed as the cable 10 is fed into the system and later opened in order to remove and retract the cable 10. If the funnels are split, they may remain closed until the solder sleeve installation.

In cases where split funnels 171 are employed, the solder sleeve installation apparatus further comprises an actuator (e.g., pneumatic cylinder 84 identified in FIG. 5) for selectively moving one or both of the first and second funnel halves 180a and 180b to achieve a transition between the open and closed states, and a computer 162 (see FIG. 5) configured to activate the actuator to move the first and second funnel halves 180a and 180b away from each other before activating the motor 72 to drive rotation of the drive wheel 16 in the cable pulling direction.

Figure 20:
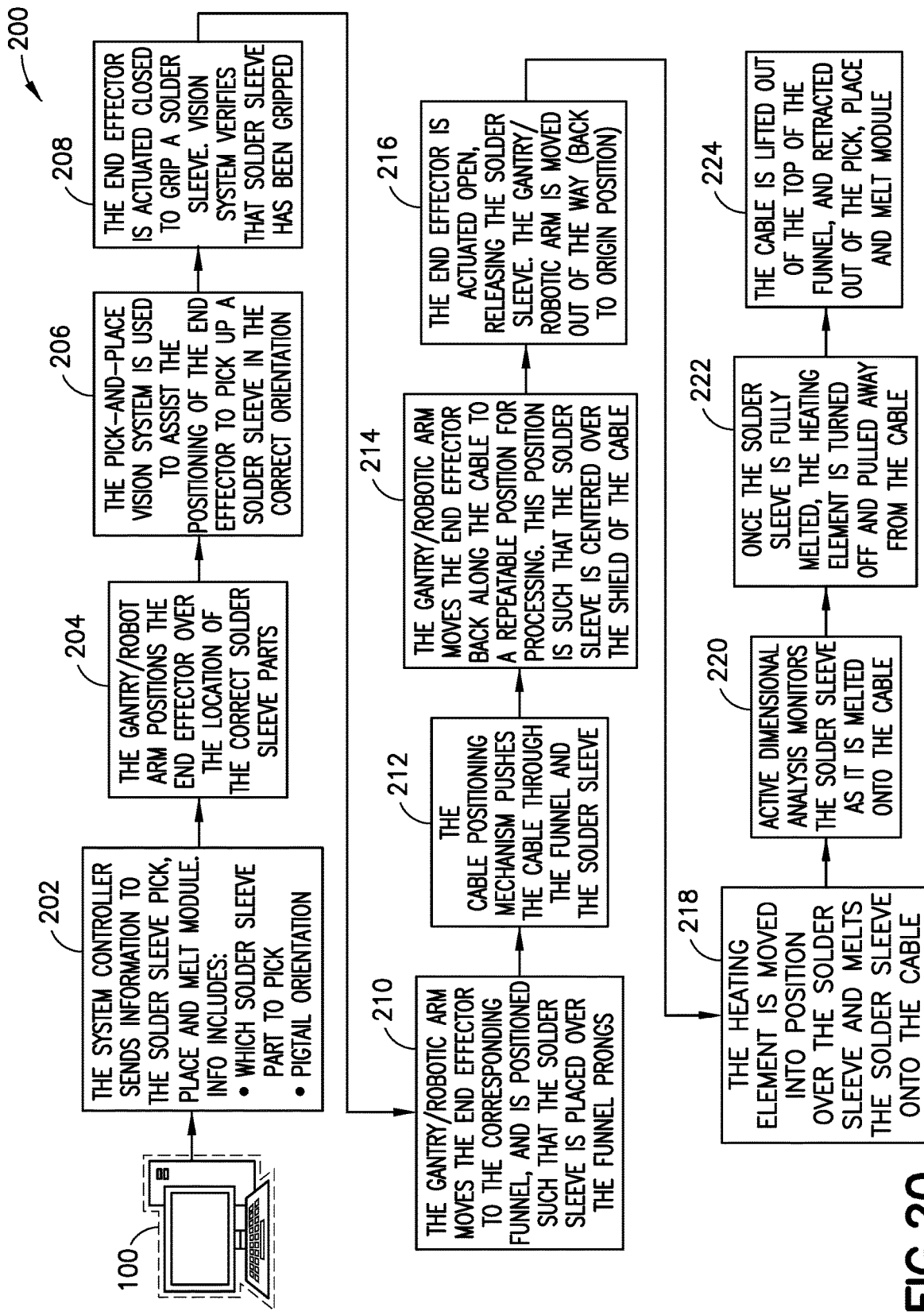
FIG. 20 is a flowchart identifying steps of a method for picking, placing and melting a solder sleeve on a shielded cable in accordance with one embodiment.

FIG. 20 is a flowchart identifying steps of a method 200 for picking, placing and melting a solder sleeve on a shielded cable in accordance with one embodiment. First, the system controller 100 sends information to the computer 162 controlling operation of the solder sleeve pick, place and melt module (step 202). The information includes which type of solder sleeve to pick and the orientation of the pigtail if one is to be attached to the sleeve. An example of a pigtail could be an insulated ground wire, or a ground braid strap, or any other wire that needs to be attached to the cable 10. The solder sleeve type is used as a factor to determine which funnel of a set of funnels should be used to pass a cable through that solder shield.

In accordance with one proposed implementation, solder sleeves and dead end sleeves are separated by part number onto different vibration tables (not shown in the drawings). Vibration tables could be replaced with tape-and-reels or cartridges. The system controller 100 tells the robotic arm or gantry with the attached end effector 108 where to move based on the solder sleeve part number that is to be installed on a cable 10. If the solder sleeve 12 is on a tape-and-reel or cartridge (not shown in the drawings), the solder sleeve 12 will be pushed out of the cavity (via pneumatic actuator, electric actuator, etc.) so that the end effector 108 can grip it.

Next the gantry/robot arm positions an end effector over the location of solder sleeves of the correct type (step 204). A pick-and-place vision system is used to assist the positioning of the end effector to pick up a solder sleeve in the correct orientation (step 206). When the end effector is properly positioned and oriented, the end effector is actuated to grip a solder sleeve (step 208). A verification step is performed to ensure the solder sleeve has been gripped and that the ground wire of the gripped solder sleeve is correctly oriented. A vision system can be used for such purposes.

The gantry/robot arm then moves the end effector so that the gripped solder sleeve is transported toward a vicinity of the corresponding funnel and then placed on the prongs of the funnel extensions (step 210). While the solder sleeve is seated on the prongs, the cable positioning mechanism at the solder sleeve installation module pushes the cable through the funnel and the solder sleeve (step 212). In certain embodiments, the cable is pushed through only a certain pre-specified length that has been calculated or is pre-programmed according to the application, wire type and shield trim characteristics.

The gantry/robot arm then moves the end effector to a repeatable position for processing (step 214) while holding the sleeve 12. This position is such that the solder sleeve is centered over the exposed shield on the cable. In accordance with one embodiment, the exposed shield of the cable and the solder sleeve may be moved concurrently and at the same speed while the solder sleeve is already centered over the exposed shield. In accordance with other embodiments, the cable is fed through the funnel until the exposed shield of the cable arrives at the repeatable position and thereafter the end effector moves the solder sleeve off of the prongs to the repeatable position. In accordance with one proposed implementation, the respective repeatable positions of the solder sleeve and the exposed shield are such that the solder sleeve surrounds the entire exposed shield. The end effector is then actuated open to release the solder sleeve and then the gantry/robot arm is moved out of the way and possibly back to an origin position (step 216).

The heating tool is then moved into position within a heating zone of the solder sleeve and activated (step 218). The heating tool generates heat in the heating zone sufficient to melt the solder sleeve onto the cable. During the melting operation, the state of the solder sleeve is monitored using active dimensional analysis (step 220). For example, a laser scan micrometer may be used to measure the decreasing outer diameter of the solder sleeve. Once the solder sleeve is melted to the desired level, the heating process is stopped. This can be achieved by turning heating tool off and pulling it away from the cable (step 222). For example, when the laser measurement indicates that the outer diameter of the solder sleeve has reached a target value indicative of a state of fully melted or melted to a desired level, the heating process is stopped. This can be achieved by turning the heating tool, such as hot-air guns, off automatically. Then the cable is lifted at least partially out of the open-top funnel and then retracted out of the pick, place and melt module (step 224). In accordance with an alternative embodiment having split (not open-top) funnels, two funnel halves are opened to provide sufficient space for the sleeve-cable assembly 1 to be retracted.

Figure 21:
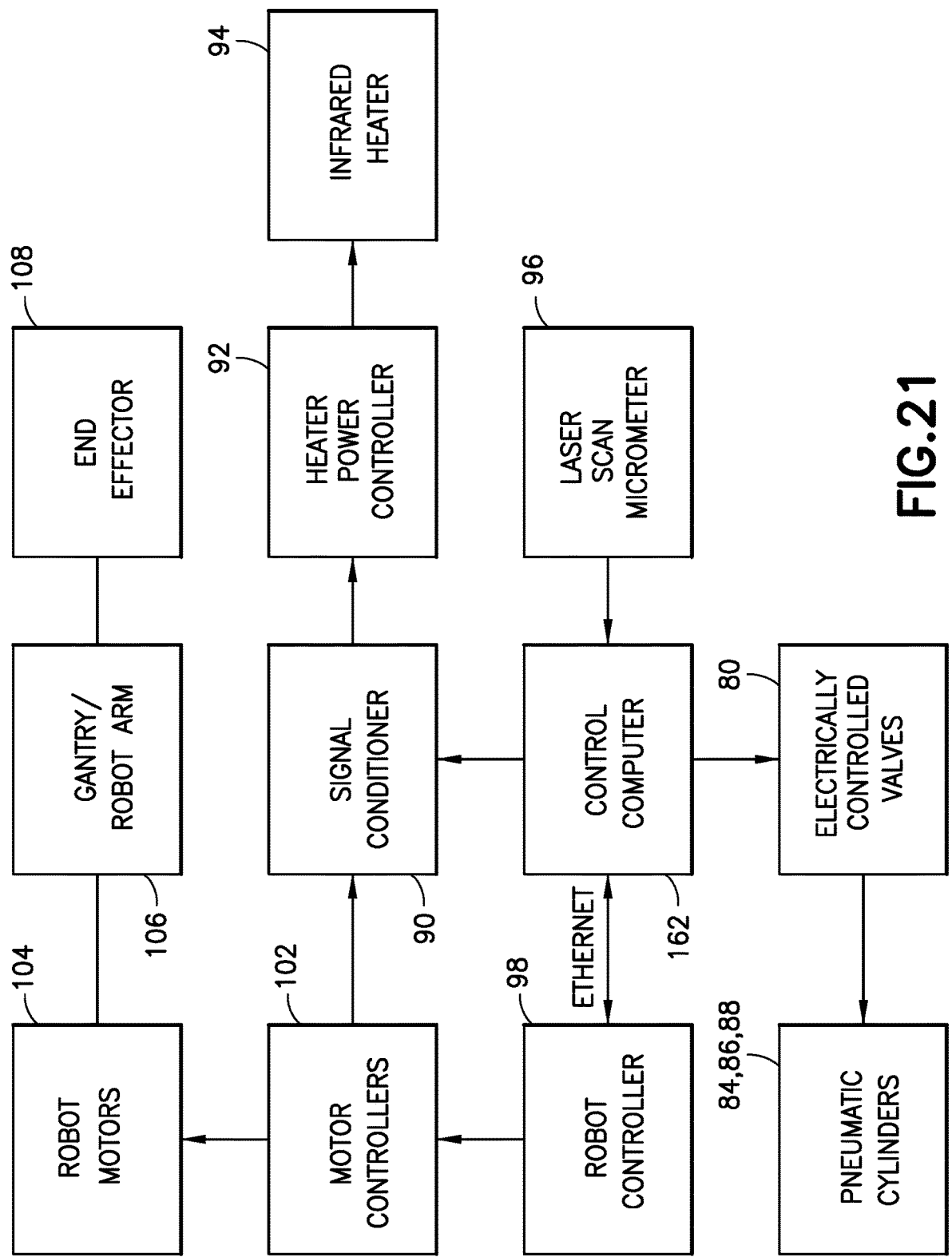
FIG. 21 is a block diagram identifying some components of an automated system for picking, placing and melting a solder sleeve on a shielded cable in accordance with one embodiment.

FIG. 21 is a block diagram identifying some components of an automated system for picking, placing and melting a solder sleeve on a shielded cable in accordance with one embodiment. The computer 162 is programmed to send control signals to various electrically controlled valves 80 which may be opened to supply compressed air to pneumatic cylinders 84, 86 and 88 as previously described. The pneumatic cylinders 84, 86 and 88 may be used to move various components of the cable processing equipment 24, such as funnel halves 180a, 180b and hot air guns 174a, 174b. In alternative embodiments, the pneumatic cylinders may be replaced by electric motors.

Still referring to FIG. 21, the computer 162 communicates with a robot controller 98 via a suitable wired or wireless connection using a suitable communication protocol (e.g., Ethernet or Bluetooth). The robot controller 98 is a computer configured to control the operation of various robot motors 104 (via motor controllers 102) that move the gantry/robot arm 106 to achieve the previously described path for the end effector 108. The robot controller 98 is also configured to control the gripping action of the end effector 108.

The computer 162 also controls the temperature in the heating zone. More specifically, the computer 162 outputs heater power control signals that control the power supplied to the infrared heating tool 94. The heater power control signals are sent by the computer 162 to a signal conditioner 90, which in turn outputs conditioned heater power control signals to a heater power controller 92. The heater power controller 92 is configured to convert conditioned heater power control signals to an output voltage which is used to power the infrared heating tool 94. In accordance with one embodiment, the outer diameter of the solder sleeve 12 may be monitored during melting using a laser scan micrometer 96. In response to measurement data from laser scan micrometer 96 indicating that the outer diameter of the shrinking solder sleeve has reached a target value, the computer 162 turns the infrared heating tool 94 off.

Figure 22:
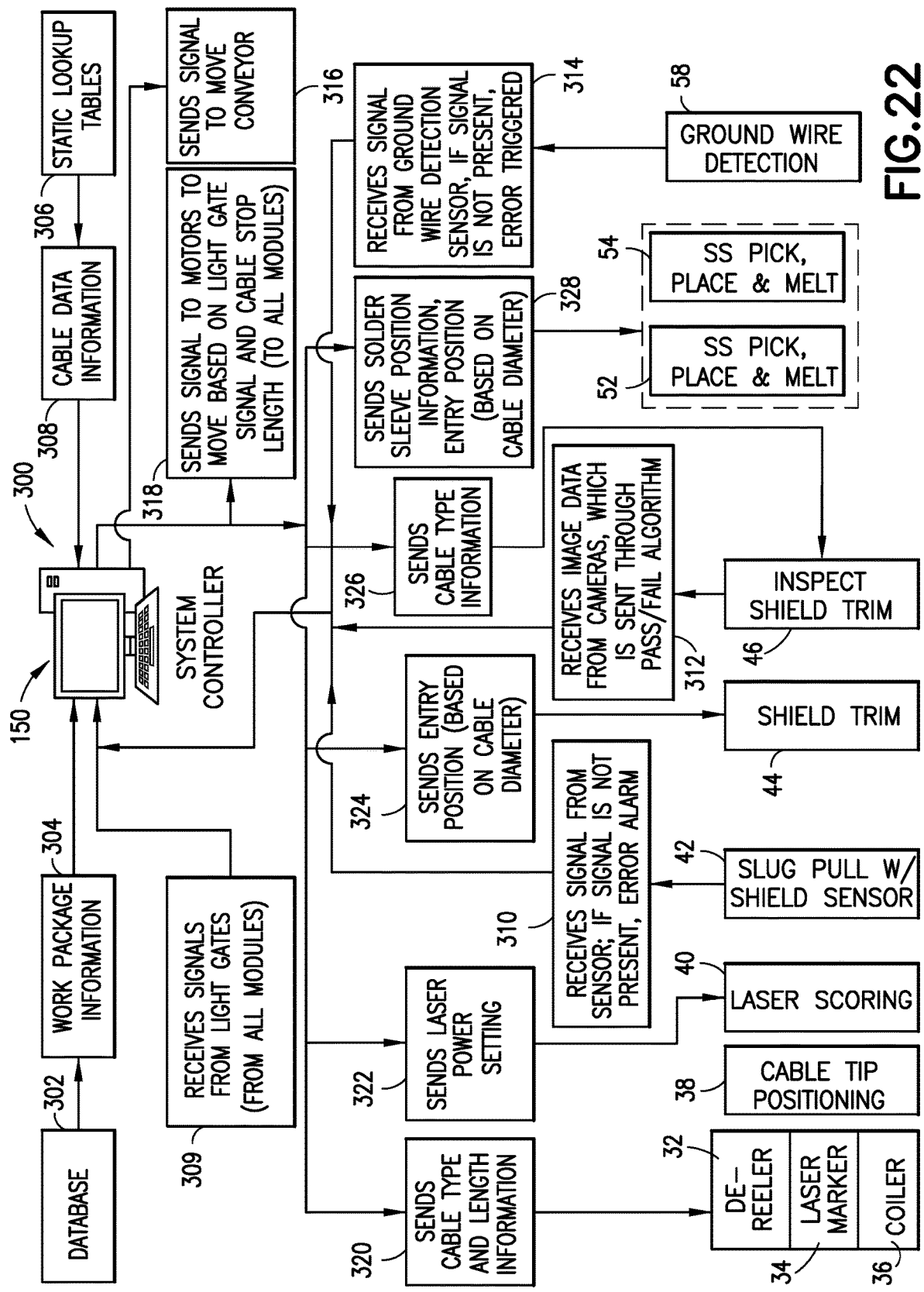
FIG. 22 is a flowchart identifying steps of a method for controlling a system having a plurality of workstations for performing a sequence of operations for installing a solder sleeve on an end of a cable in accordance with one embodiment.

The system depicted in FIG. 1 may be operated under the control of a system controller 150 (shown in FIG. 22). FIG. 22 is a flowchart identifying steps of a method 300 for controlling a system having a plurality of workstations for performing a sequence of operations for installing a solder sleeve 12 on an end of a cable 10 in accordance with one embodiment. The system controller 150 receives work packages and information 304 from a database 302 and also receives cable information 308 from static look-up tables 306. The system controller 150 parses the data and uses the information to run the system. The cables to be processed may be intended for installation on an airplane or other vehicle or in other types of electrical systems. In the case of cables intended for installation on an airplane, the cables in a work package are organized by airplane effectivity, bundle number, wire type, and then group code.

An example of a work package is production data or information and may include the wire bundle that includes the identifying numbers of the cable to be processed by the system and the solder sleeve to be installed the overall cable length, to what equipment the cable will connect from and to, the cable type, the airplane effectivity, what type of airplane (program code), the wire bundle dash number, the wire gauge (this is the gauge of the wires in the cable), the bundle group code, and the termination code (designates what kind of contact or other termination is applied to the wires and shield of the cable).

Static look-up tables are used to configure the system parameters based on the parameters of a cable in the production file (work package). Examples of data stored in the static lookup tables include: the size of the dead end sleeve that fits the cable; the size and type of solder sleeve that fits the cable; an alternative size of solder sleeve that fits the cable if the primary solder sleeve size is out of stock or otherwise unavailable; the size of funnel that should be used to feed the cable into the solder sleeve pick, place and melt station; the wire colors that are present on the cable (to be sent to the vision inspection system after the shield is trimmed); the solder sleeve "fully installed" diameter, which is the value that is sent to the solder sleeve pick, place and melt station if active dimensional analysis is used to monitor the installation of a sleeve part; the strip length of the cable if a solder sleeve is to be installed (which is determined by both what equipment the cable is terminated to, as well as the termination type code); the strip length of the cable if a dead end sleeve is to be installed; and the orientation of the ground wire (pigtail) if a solder sleeve is installed.

The system controller 150 sends signals for controlling movements of the various components of the cable delivery system 60 or 61 (step 316). The system controller 150 also receives signals representing the states of the light gates from all modules (step 309). The system controller 150 also determines, derives or retrieves from a lookup table how far the cable positioning mechanism 19 should drive the cable 10 into each module based on cable strip length information. The cable strip length is used to calculate the length of the cable that needs to be driven into each module such that the cable is processed at the correct location. The system controller 150 sends control signals to the various motor controllers (or computer in command of the motor controller) to cause the motors to move based on signals received from the various light gates and the cable strip length (step 318).

Still referring to FIG. 22, cables are sent one at a time to the de-reeler module 32 to be cut and loaded onto the system. The system controller 150 sends cable type and length information to the de-reeler module 32 (step 320). The de-reeler module 32 de-reels a continuous length of cable of the specified type and then cuts the cable to the specified length. For each length of cable 10, the laser marker 34 laser marks the outer jacket 2 of the cable 10 with pertinent information (bundle number, wire number, gauge).

In addition, the system controller 150 uses cable insulation information to select the appropriate laser setting and send it to the laser scoring module 40 (step 322). The system controller 150 also uses the cable type information to determine the correct type of solder sleeve or dead end sleeve and then sending commands to the solder sleeve installation modules 52 and 54 specifying which open-top funnel should be used (based on cable diameter) and where the solder sleeve 12 should be positioned after its removal from the prong (step 328). The same signals specifying which open-top funnel should be used are sent to the shield trimming module 44 (step 324). In addition, the system controller sends cable type information to the shield trim inspection module 46 (step 326).

The system controller 150 is also configured to monitor the system for errors. For example, the system controller 150 receives signals from the shield sensor in the jacket slug pulling module 42 (step 310). If the signal is not present, the system controller 150 issues an error alarm. Also, the system controller 150 receives image data from cameras at the shield trim inspection module 46, which image data is processed using a pass/fail algorithm (step 312). In addition, the system controller 150 receives signals from the ground wire detection module 58 (step 314). If the signal is not present, the system controller 150 generates an error message.

While methods and apparatus for installing a sleeve on a cable have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline and/or wireless connections or over the cloud. Such processing or computing devices typically include one or more of the following: a processor, a computer, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. For example, the control computer 162 and robot controller 98 identified in FIG. 21 form a "computer system". The above examples are exemplary only, and thus are not intended to limit in any way the definition and/or meaning of the term "computer system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. An apparatus for installing a solder sleeve on a cable, the apparatus comprising:
a funnel having a channel that narrows in width from an entry side to an exit side;
a funnel extension attached to or integrally formed with the funnel and extending from the exit side of the funnel, the funnel extension comprising a prong configured to fit between the cable and the solder sleeve that surrounds the cable;
a robotic arm;
an end effector mounted to the robotic arm and configured to grip the solder sleeve when in a closed state; and a computer system configured to control movements of the robotic arm and a state of the end effector in accordance with a program in which the end effector picks up the solder sleeve, then places the solder sleeve on the prong and then, after a delay of sufficient duration to enable an end of the cable to pass through the funnel and the solder sleeve, moves the solder sleeve off the prong to a zone at a distance from the funnel extension.

2. The apparatus as recited in claim 1, wherein the cable is a shielded cable having an exposed shield, the solder sleeve comprises a solder ring and a pair of insulating rings, the solder sleeve is melted over the exposed shield, and the end effector is configured to grip the solder sleeve between the solder ring and the insulating rings when in a closed state.

3. The apparatus as recited in claim 1, further comprising a heater capable of producing enough heat to melt material of the solder sleeve in a heating zone at a distance from the funnel extension, wherein the computer system is further configured to control the heater to produce heat in the heating zone sufficient to melt the solder sleeve on the cable.

4. The apparatus as recited in claim 1, wherein the channel of the funnel is open, the apparatus further comprising:
a linear actuator having a retracted state and an extended state; and
a lever arm mounted to the linear actuator, the lever arm being movable upward along a path that engages the cable when the linear actuator transitions from the retracted state to the extended state, thereby lifting the cable out of the funnel extension, and
wherein the computer is further configured to send a control signal to activate the linear actuator to transition from the retracted state to the extended state after the sleeve has been moved to the heating zone at a distance from the funnel.

5. The apparatus as recited in claim 1, wherein the funnel extension terminates in a pair of prongs which are sized and configured to fit within an inner diameter of the sleeve.

6. The apparatus as recited in claim 5, wherein the prongs are tapered along their lengths so that the prongs easily enter the solder sleeve as the solder sleeve is moved into position.

7. The apparatus as recited in claim 6, wherein the prongs are made of a material having a low coefficient of friction so that the cable may easily slide along interior surfaces of the prongs.

8. An apparatus for installing a sleeve on a cable, the apparatus comprising:
a funnel having an open channel that narrows in width from an entry side to an exit side;
a funnel extension attached to or integrally formed with the funnel and extending from the exit side of the funnel, the funnel extension comprising a prong configured to fit between the cable and the sleeve that surrounds the cable;
a robotic arm;
an end effector mounted to the robotic arm and configured to grip the sleeve when in a closed state;
a linear actuator having a retracted state and an extended state;
a lever arm mounted to the linear actuator, the lever arm being movable upward along a path that engages the cable when the linear actuator transitions from the retracted state to the extended state, thereby lifting the cable out of the funnel extension; and
a computer system configured to control movements of the robotic arm and a state of the end effector in accordance with a program in which the end effector picks up the sleeve, then places the sleeve on the prong and then, after a delay of sufficient duration to enable an end of the cable to pass through the funnel and the sleeve, moves the sleeve off the prong to a zone at a distance from the funnel extension, the computer system being further configured to send a control signal to activate the linear actuator to transition from the retracted state to the extended state after the sleeve has been moved to the heating zone at a distance from the funnel.

9. The apparatus as recited in claim 8, wherein the cable is a shielded cable having an exposed shield, the sleeve is a solder sleeve comprising a solder ring and a pair of insulating rings, and the solder sleeve is melted over the exposed shield, and the end effector is configured to grip the solder sleeve between the solder ring and the insulating rings when in a closed state.

10. The apparatus as recited in claim 9, further comprising a heater capable of producing enough heat to melt material of the solder sleeve in a heating zone at a distance from the funnel extension, wherein the computer system is further configured to control the heater to produce heat in the heating zone sufficient to melt the solder sleeve on the cable.

11. The apparatus as recited in claim 10, further comprising a cover having one end attached to the end effector, wherein the funnel has an open top and the cover is configured to cover the open top of the funnel when the solder sleeve is placed on the prong.

12. The apparatus as recited in claim 11, wherein the end effector comprises a pair of gripper fingers and respective pairs of claws attached to the gripper fingers respectively for forming a sleeve gripper.

13. The apparatus as recited in claim 8, further comprising a heater capable of producing enough heat to melt material of the sleeve in a heating zone at a distance from the funnel extension, wherein the computer system is further configured to control the heater to produce heat in the heating zone sufficient to melt the sleeve on the cable.

14. The apparatus as recited in claim 13, further comprising a cover having one end attached to the end effector, wherein the funnel has an open top and the cover is configured to cover the open top of the funnel when the solder sleeve is placed on the prong.

15. The apparatus as recited in claim 14, wherein the end effector comprises a pair of gripper fingers and respective pairs of claws attached to the gripper fingers respectively for forming a sleeve gripper.

16. The apparatus as recited in claim 8, further comprising a cover having one end attached to the end effector, wherein the funnel has an open top and the cover is configured to cover the open top of the funnel when the solder sleeve is placed on the prong.

17. The apparatus as recited in claim 16, wherein the end effector comprises a pair of gripper fingers and respective pairs of claws attached to the gripper fingers respectively for forming a sleeve gripper.

18. The apparatus as recited in claim 8, wherein the end effector comprises a pair of gripper fingers and respective pairs of claws attached to the gripper fingers respectively for forming a sleeve gripper.

19. The apparatus as recited in claim 8, wherein the funnel extension terminates in a pair of prongs which are sized and configured to fit within an inner diameter of the sleeve.

20. The apparatus as recited in claim 19, wherein the prongs are tapered along their lengths so that the prongs easily enter the solder sleeve as the solder sleeve is moved into position.

21. The apparatus as recited in claim 20, wherein the prongs are made of a material having a low coefficient of friction so that the cable may easily slide along interior surfaces of the prongs.

* * * * *